US010678095B2

(12) United States Patent
Park et al.

(10) Patent No.: US 10,678,095 B2
(45) Date of Patent: Jun. 9, 2020

(54) LIQUID CRYSTAL COMPOSITION, DISPLAY DEVICE USING THE SAME, AND METHOD OF MANUFACTURING DISPLAY DEVICE

(71) Applicants: SAMSUNG DISPLAY CO., LTD., Yongin-si, Gyeonggi-do (KR); INDUSTRIAL COOPERATION FOUNDATION CHONBUK NATIONAL UNIVERSITY, Jeonju-si, Jeollabuk-do (KR)

(72) Inventors: Heung Shik Park, Seoul (KR); Shin Woong Kang, Jeonju-si (KR); Ki Chul Shin, Seongnam-si (KR); Myong Hoon Lee, Jeonju-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 282 days.

(21) Appl. No.: 15/439,179

(22) Filed: Feb. 22, 2017

(65) Prior Publication Data

US 2018/0059487 A1 Mar. 1, 2018

(30) Foreign Application Priority Data

Aug. 29, 2016 (KR) .................. 10-2016-0110160

(51) Int. Cl.
*C09K 19/56* (2006.01)
*G02F 1/1337* (2006.01)
*G02F 1/1341* (2006.01)

(52) U.S. Cl.
CPC ........ *G02F 1/133711* (2013.01); *C09K 19/56* (2013.01); *G02F 1/1341* (2013.01);
(Continued)

(58) Field of Classification Search
CPC .................................................. C09K 19/56
See application file for complete search history.

(56) References Cited

U.S. PATENT DOCUMENTS 9,448,438 B2 9/2016 Park et al.

FOREIGN PATENT DOCUMENTS

CN 103342657 A * 10/2013
KR 1020150022129 A 3/2015
(Continued)

OTHER PUBLICATIONS

KR-101663895-B1 Machine English Translation (Year: 2019).*
Machine English Translation of CN-103342657-A (Year: 2019).*

*Primary Examiner* — Chanceity N Robinson
(74) *Attorney, Agent, or Firm* — Cantor Colburn LLP

(57) ABSTRACT

A display device includes: a display panel including an insulating substrate, a first electrode disposed on the insulating substrate, and a second electrode disposed on the insulating substrate and disposed to be insulated from the first electrode; a liquid crystal layer disposed on the display panel; and an alignment-inducing layer disposed between the display panel and the liquid crystal layer, wherein the alignment-inducing layer includes a compound having a structure represented by Chemical Formula 1-A:

Chemical Formula 1-A (Continued)

In Chemical Formula 1-A above, $R_1$ is a hydrophilic group, $R_2$ is a hydrogen atom,

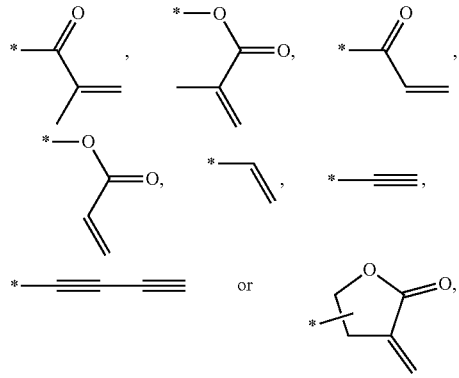

and A is an alkylene group of 1 to 20 carbon atoms, an alkyleneoxy group of 1 to 20 carbon atoms, or a single bond.

7 Claims, 25 Drawing Sheets

(52) U.S. Cl.
  CPC .. *G02F 1/133723* (2013.01); *G02F 1/133788* (2013.01); *G02F 2001/133726* (2013.01); *G02F 2202/023* (2013.01)

(56) References Cited

FOREIGN PATENT DOCUMENTS

KR           101663895 B1 * 10/2016
WO         2015026191 A1    2/2015

* cited by examiner

LIQUID CRYSTAL COMPOSITION, DISPLAY DEVICE USING THE SAME, AND METHOD OF MANUFACTURING DISPLAY DEVICE

This application claims priority to Korean Patent Application No. 10-2016-0110160, filed on Aug. 29, 2016 in the Korean Intellectual Property Office, and all the benefits accruing therefrom under 35 U.S.C. § 119, the disclosure of which in its entirety is herein incorporated by reference.

BACKGROUND

1. Field

The present disclosure relates to a liquid crystal composition, a method of manufacturing a display device using the same, and a display device manufactured by the method.

2. Description of the Related Art

A liquid crystal display device, which is one type of widely used flat panel display devices, includes two substrates provided with field generating electrodes, such as a pixel electrode and a common electrode, and a liquid crystal layer disposed between the two substrates. The liquid crystal display device is configured such that when a voltage is applied to the field generating electrodes to generate an electric field in the liquid crystal layer, the direction of liquid crystals in the liquid crystal layer is determined and the polarization of incident light is controlled, thereby displaying an image.

In order for the liquid crystal display device to display an image, liquid crystals in the liquid crystal layer should be initially aligned in a predetermined direction. The uniformity of the initial alignment of the liquid crystals is an important factor determining the display quality of the liquid crystal display device.

There thus remains a need for liquid crystal display devices having improved alignment properties.

SUMMARY

As a method for initially aligning liquid crystals, a method of using an alignment film made of a polymer having a photoreactive group, for example, a polyimide having a photoreactive group in a repeating unit has been used. The photoreactive group can be isomerized or decomposed by reaction with light, thus imparting anisotropy to the alignment film.

However, such an alignment film using a polymer having a photoreactive group has a limitation in improving the display quality of the liquid crystal display device. For example, since the polymer alignment film having a photoreactive group has low thermal stability and does not have high film hardness, defective afterimages may occur.

An aspect of the present disclosure is to provide a liquid crystal composition which is capable of initially aligning liquid crystals without using a polymer alignment film.

Another aspect of the present disclosure is to provide a display device which can reduce the formation of defective afterimages by improving liquid crystal alignment stability and having an improved reaction rate. A method of manufacturing the display device is also provided.

According to an exemplary embodiment of the disclosure, a display device includes: a display panel including an insulating substrate, a first electrode disposed on the insulating substrate, and a second electrode disposed on the insulating substrate and disposed to be insulated from the first electrode; a liquid crystal layer disposed on the display panel; and an alignment-inducing layer disposed between the display panel and the liquid crystal layer, wherein the alignment-inducing layer includes a compound having a structure represented by Chemical Formula 1-A below:

Chemical Formula 1-A

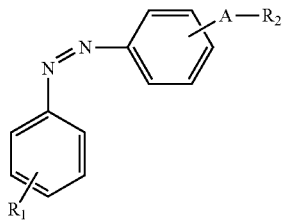

In Chemical Formula 1-A above, $R_1$ is a hydrophilic group, $R_2$ is a hydrogen atom,

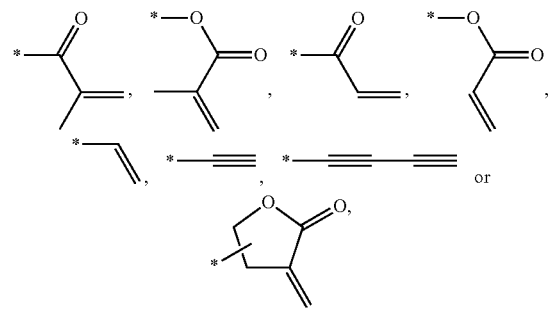

and A is an alkylene group of 1 to 20 carbon atoms, an alkyleneoxy group of 1 to 20 carbon atoms, or a single bond.

In an exemplary embodiment, the compound having a structure represented by Chemical Formula 1-A above may be aligned on a surface of the display panel, the end group $R_1$ of Chemical Formula 1-A above may be aligned toward the surface of the display panel, and the linking group A of Chemical Formula 1-A above may be aligned in a direction parallel to the surface of the display panel.

In an exemplary embodiment, the liquid crystal layer may include a photocurable monomer, and the alignment-inducing layer may further include a photocurable polymer.

In an exemplary embodiment, the alignment-inducing layer may further include a compound having a structure represented by Chemical Formula 2-A below:

Chemical Formula 2-A

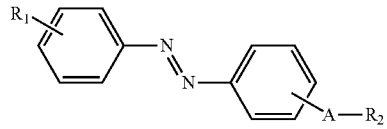

In Chemical Formula 2-A above, $R_1$, $R_2$, and A are the same as those defined in Chemical Formula 1-A above.

In an exemplary embodiment, the alignment-inducing layer may consist of the compound having a structure represented by Chemical Formula 1-A above, the compound having the structure represented by Chemical Formula 2-A above, and the photocurable polymer.

According to an exemplary embodiment of the disclosure, there is provided a liquid crystal composition including: a plurality of liquid crystals; a photocurable monomer; and a compound having a structure represented by Chemical Formula 2-A below:

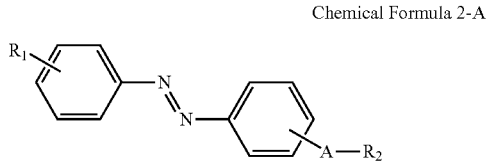

Chemical Formula 2-A

In Chemical Formula 2-A above, $R_1$ is a hydrophilic group, $R_2$ is a hydrogen atom,

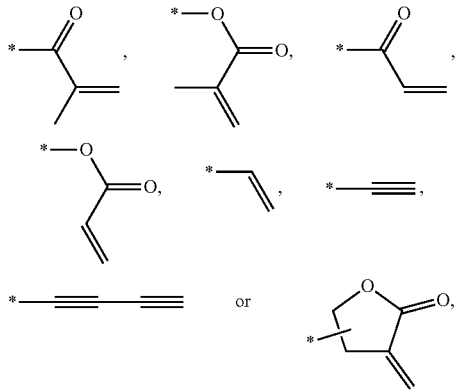

and A is an alkylene group of 1 to 20 carbon atoms, an alkyleneoxy group of 1 to 20 carbon atoms, or a single bond.

In an exemplary embodiment, the compound having a structure represented by Chemical Formula 2-A above may be a compound having a structure represented by Chemical Formula 2-B below:

Chemical Formula 2-B

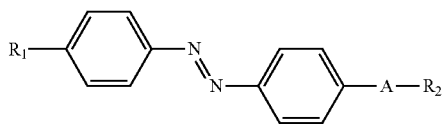

In Chemical Formula 2-B above, $R_1$ is

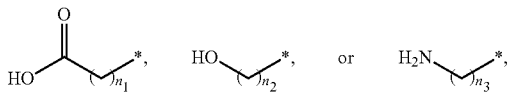

$n_1$ is an integer of 0 to 2, and $n_2$ and $n_3$ are each independently an integer of 1 to 3, and $R_2$ and A are the same as those defined in Chemical Formula 2-A above.

In an exemplary embodiment, the compound having the structure represented by Chemical Formula 2-A above may be a compound having a structure represented by Chemical Formula 2-G below:

Chemical Formula 2-G

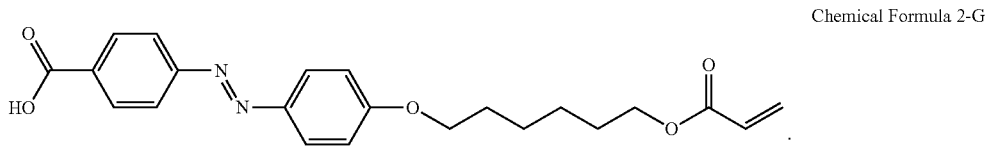 [SMILES: C=CC(=O)OCCCCCCOc1ccc(/N=N/c2ccc(C(=O)O)cc2)cc1]

In an exemplary embodiment, the photocurable monomer may include a mesogen core structure and at least one end group selected from In an exemplary embodiment, the liquid crystal composition may have positive dielectric anisotropy, and the compound having the structure represented by Chemical Formula 2-A above may have a molecular weight of about 200 to about 650 grams per mole (g/mol).

In an exemplary embodiment, based on the total weight of the liquid crystal composition, the content of the photocurable monomer may be about 0.01 weight percent (wt %) to about 2.0 wt %, and the content of the compound having the structure represented by Chemical Formula 1-A may be about 0.01 wt % to about 1.0 wt %.

In an exemplary embodiment, the solubility of the compound having the structure represented by Chemical Formula 2-A above to the plurality of liquid crystals at 25° C. may be about 0.01 wt % to about 0.2 wt %.

According to an exemplary embodiment of the disclosure, a method of manufacturing a display device includes: providing a liquid crystal composition including liquid crystal and a compound having an azobenzene group onto a substrate and forming a liquid crystal layer and a pre-alignment inducing layer; and irradiating the liquid crystal layer with light.

In an exemplary embodiment, the liquid crystal composition may further include a photocurable monomer, and the photocurable monomer is uniformly dispersed in the liquid crystal layer irradiated with light.

In an exemplary embodiment, in the irradiating the liquid crystal layer with light, the light has a wavelength of about 350 nanometers (nm) to about 450 nm.

In an exemplary embodiment, the forming the pre-alignment inducing layer may include aligning the compound having an azobenzene group on the surface of the substrate, wherein the compound having an azobenzene group may be a compound represented by Chemical Formula 2-A below, and the compound having a structure represented by Chemical Formula 2-A may be converted into a compound having a structure represented by Chemical Formula 1-A below by the irradiating the liquid crystal layer with light:

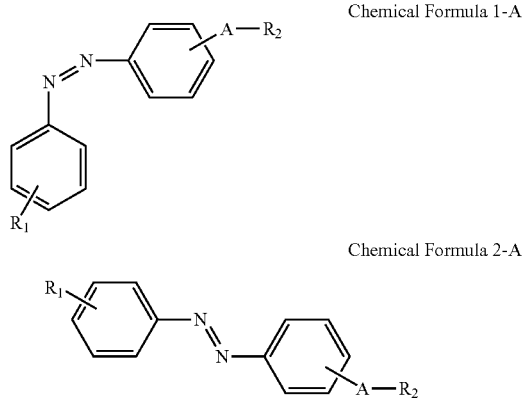

Chemical Formula 1-A

Chemical Formula 2-A

In Chemical Formulae 1-A and 1-B, $R_1$ is a hydrophilic group, $R_2$ is a hydrogen atom,

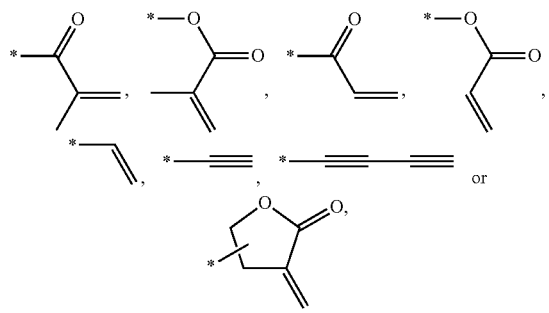

and A is an alkylene group of 1 to 20 carbon atoms, an alkyleneoxy group of 1 to 20 carbon atoms, or a single bond.

In an exemplary embodiment, the liquid crystal composition may further include a photocurable monomer, the irradiating the liquid crystal layer with light may be irradiating light having a first wavelength, and irradiating light having a second wavelength shorter than the first wavelength after the radiating the liquid crystal layer with light having a first wavelength.

In an exemplary embodiment, the liquid crystal composition may further include a photocurable monomer, the irradiating the liquid crystal layer with light is irradiating light having a first wavelength at a first exposure, and irradiating the light having a first wavelength at a second exposure greater than the first exposure after the irradiating the light having the first wavelength at the first exposure.

In an exemplary embodiment, the method may further comprise: heating the liquid crystal layer to a temperature which is about 0.1° C. to about 20° higher than the isotropic phase transition temperature of the liquid crystal composition, after forming the liquid crystal layer and the pre-alignment inducing layer and before irradiating the liquid crystal layer with light.

In an exemplary embodiment, the method may further comprise: cooling the liquid crystal layer to the isotropic phase transition temperature of the liquid crystal composition between the heating the liquid crystal layer and the radiating the light.

However, aspects of the present disclosure are not restricted to those set forth herein. The above and other aspects of the present disclosure will become more apparent to one of ordinary skill in the art to which the present disclosure pertains by referencing the detailed description provided below.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
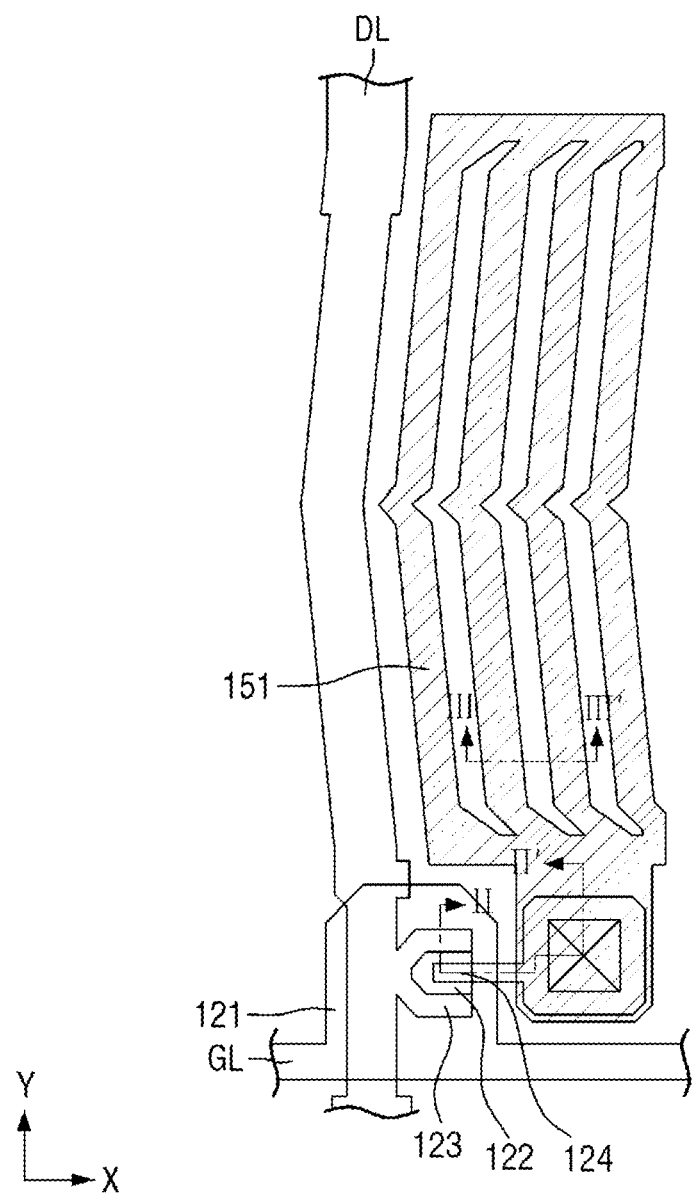
FIG. 1 is a plan view of a pixel of a first display panel included in a display device according to an embodiment.

Features of the disclosure and methods of accomplishing the same may be understood more readily by reference to the following detailed description of preferred embodiments and the accompanying drawings. The disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the disclosure will only be defined by the appended claims.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, including "at least one," unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof "At least one" is not to be construed as limiting "a" or "an." "Or" means "and/or." As used herein, the term "and/or" includes any and all combinations of one or more of the associated listed items.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In the present specification, the first direction X refers to any one direction in a plane, the second direction Y refers to a direction intersecting the first direction X in the plane, and the third direction Z refers to a direction perpendicular to the plane.

Unless defined otherwise, the symbol "*" used herein refers to a bonding site where adjacent atoms are covalently bonded.

Unless defined otherwise, the term "alkyl group" used herein refers to a monovalent hydrocarbon group where one hydrogen atom is removed from a linear or branched aliphatic saturated hydrocarbon and having the specified number of carbon atoms, and may be represented by *—$C_nH_{2n+1}$ (here, n is a natural number). Alkyl groups include, for example, groups having from 1 to 50 carbon atoms.

Unless defined otherwise, the term "alkoxy group" used herein refers to an alkyl group that is linked via an oxygen atom (i.e., —O-alkyl), and may be represented by *—O—$C_nH_{2n+1}$ (here, n is a natural number). Nonlimiting examples of C1 to C30 alkoxy groups include methoxy groups, ethoxy groups, propoxy groups, isobutyloxy groups, sec-butyloxy groups, pentyloxy groups, iso-amyloxy groups, and hexyloxy groups.

Unless defined otherwise, the term "alkylene group" used herein refers to a divalent aliphatic hydrocarbon group where two hydrogen atoms are removed from a linear or branched aliphatic saturated hydrocarbon, which may have from 1 to about 20 carbon atoms, and may be represented by *—$C_nH_{2n}$—* (here, n is a natural number).

Unless defined otherwise, the term "alkylenoxy group" used herein refers to a divalent group where an alkylene group that is linked via an oxygen atom, and may be represented by *—O—$C_nH_{2n}$—* (here, n is a natural number) or *—$C_nH_{2n}$—O—* (here, n is a natural number).

Hereinafter, embodiments of the present disclosure will be described in detail with reference to the attached drawings.

Figure 2:
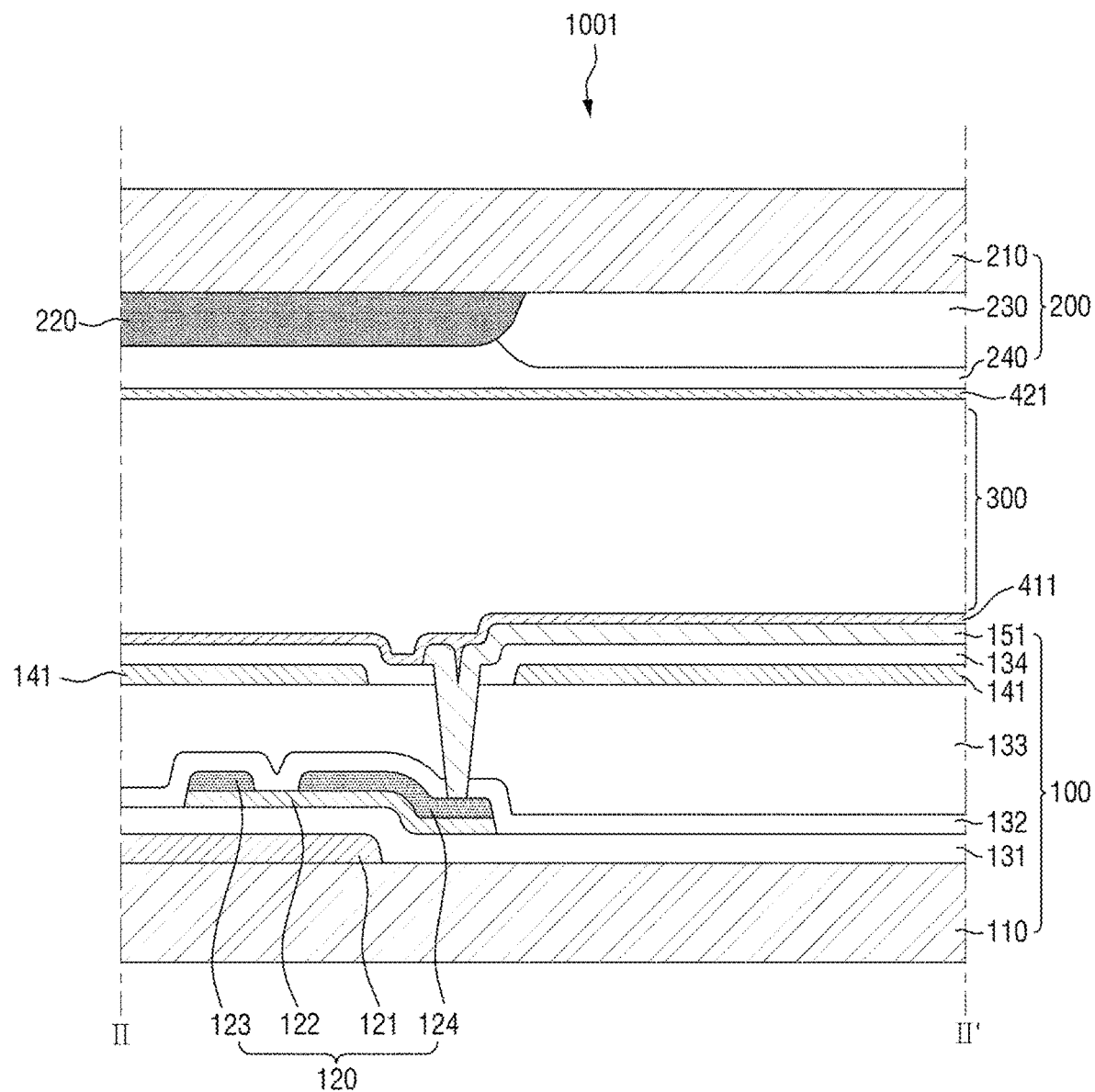
FIG. 2 is a cross-sectional view taken along the line II-II' of FIG. 1.
Figure 3:
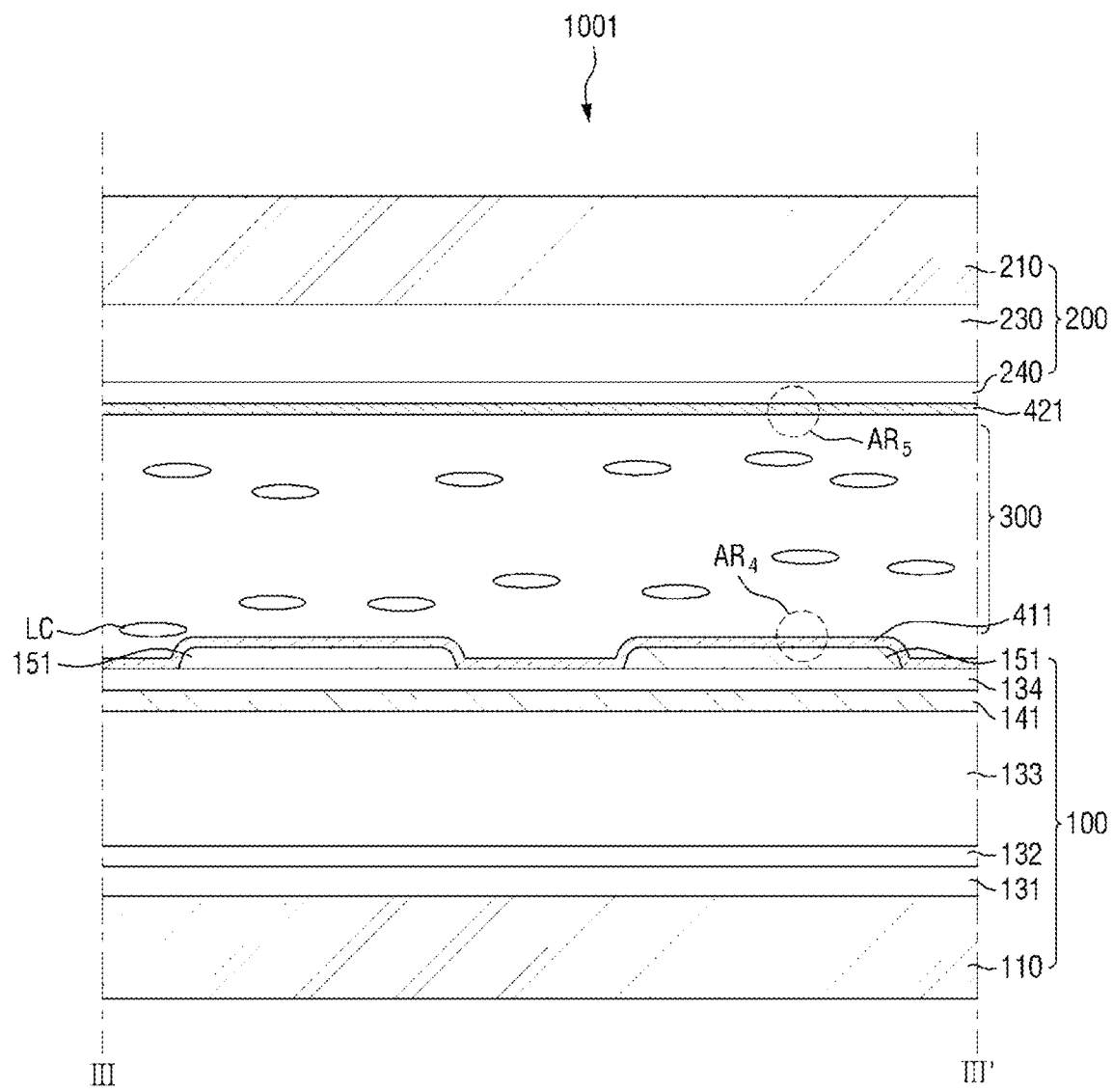
FIG. 3 is a cross-sectional view taken along the line of FIG. 1.

FIG. 1 is a plan view of a pixel of a first display panel included in a display device according to an embodiment, FIG. 2 is a cross-sectional view taken along the line II-II' of FIG. 1, and FIG. 3 is a cross-sectional view taken along the line of FIG. 1.

Referring to FIGS. 1 to 3, the display device 1001 according to this embodiment includes a first display panel 100, a second display panel 200 facing the first display panel 100, a liquid crystal layer 300 interposed between the first display panel 100 and the second display panel 200, a first alignment-inducing layer 411 disposed between the first display panel 100 and the liquid crystal layer 300, and a second alignment-inducing layer 421 disposed between the second display panel 200 and the liquid crystal layer 300. The display device 1001 may further include one or more polarizers (not shown) disposed outside the first display panel 100 and/or the second display panel 200.

The first display panel 100 is a panel provided with a switching element 120 for controlling the alignment direction of liquid crystals in the liquid crystal layer 300, and the second display panel 200 may be a counter panel for enclosing the liquid crystal layer 300 together with the first display panel 100.

The first display panel 100 may include a first insulating substrate 110, a switching element 120 disposed on the first insulating substrate 110, a first electrode 141 disposed on the switching element 120, and a second electrode 151 disposed on the switching element 120 and disposed so as to be insulated from the first electrode 151.

The first insulating substrate 110 may be a transparent insulating substrate. For example, the first insulating substrate 110 may be a glass or plastic substrate. In some embodiments, the first insulating substrate 110 may have flexibility.

The switching element 120 may be disposed on the first insulating substrate 110. The switching element 120 may be a thin film transistor including a gate electrode 121 disposed on the first insulating substrate 110, an active layer 122 disposed on the gate electrode 121, and a source electrode 123 and drain electrode 124 disposed on the active layer 122 to be spaced a distance apart from each other. The gate electrode 121, which is a control terminal, may be connected with a gate line GL to receive a gate driving signal, the source electrode 123, which is an input terminal, may be connected with a data line DL to receive a data driving signal, and the drain electrode 124, which is an output terminal, may be electrically connected with the second electrode 151. The active layer 122 serves as a channel of the thin film transistor, and may turn on or turn off according to a voltage applied to the gate electrode 121.

The gate electrode 121 and the active layer 122 may be insulated from each other by a first insulating film 131. A protection film 132 is disposed on the active layer 122, the source electrode 123, and the drain electrode 124 to prevent lower electrodes from being in direct contact with an organic material. The first insulating film 131 and the protection film 132 may be made of an inorganic material. Examples of the inorganic material may include at least one selected from silicon nitride ($SiN_x$), silicon oxide ($SiO_x$), silicon nitroxide ($SiN_xO_y$), and silicon oxynitride ($SiO_xN_y$). A planarization layer 133 may be disposed on the protection film 132. The planarization layer 133 may be made of an organic material. The planarization layer 133 may make the heights of components laminated on the first insulating substrate 110 uniform.

The first electrode 141 and the second electrode 151 may be disposed on the planarization layer 133. The first electrode 141 may be a common electrode to which a common voltage is applied, and the second electrode 151 may be a pixel electrode controlled by a data voltage. It is shown in FIG. 2 that the pixel electrode is disposed on the common electrode, but the common electrode and the pixel electrode may be on the same layer, or the common electrode may be disposed on the pixel electrode. The first electrode 141 and the second electrode 151 may be transparent electrodes. Examples of the material forming the transparent electrode may include at least one selected from indium tin oxide and indium zinc oxide. The first electrode 141 and the second electrode 151 may be disposed to be insulated from each other by a second insulating film 134. The second insulating film 134 may be made of an inorganic material. The first electrode 141 may be disposed over the entire surface of the first insulating substrate 110 except for a contact hole region in a plan view. The second electrode 151 may be disposed for each pixel. The second electrode 151 may include a plurality of fine branch electrodes, and may have slits formed therebetween. The plurality of fine branch electrodes may extend in the second direction Y. The second electrode 151 applies an electric field to the liquid crystal layer 300 together with the first electrode 141 to control the alignment direction of liquid crystals LC.

Subsequently, the second display panel 200 will be described. The second display panel 200 may include a second insulating substrate 210, a light-blocking member 220 and color filter 230 disposed beneath the second insulating substrate 210, and an overcoat layer 240 disposed beneath the light-blocking member 220 and the color filter 230.

The second insulating substrate 210, similar to the first insulating substrate 110, may be a transparent insulating substrate. The light-blocking member 220 may be made of a material capable of blocking the transmission of light by absorbing or reflecting light of a specific wavelength band. For example, the light-blocking member 220 may be a black matrix. The color filter 230 may absorb a specific wavelength of transmitted light or may convert the wavelength of transmitted light into a specific wavelength. That is, the color filter 230 may selectively transmit only the light of a predetermined, specific wavelength band. It is shown in FIG. 2 that the light-blocking member 220 and the color filter 230 are disposed beneath the second insulating substrate 210, but at least one of the light-blocking member 220 and the color filter 230 may be disposed on the first insulating layer 110. An overcoat layer 240 may be disposed beneath the light-blocking member 220 and the color filter 230. The overcoat layer 240 may be made of an organic material. The overcoat layer 240 may make the heights of the plurality of components laminated beneath the second insulating substrate 210 uniform.

Subsequently, the liquid crystal layer 300 will be described. The liquid crystal layer 300 includes a plurality of liquid crystals LC. The liquid crystals LC may have positive dielectric anisotropy. In another embodiment, the liquid crystals LC may have negative dielectric anisotropy. The liquid crystals LC are arranged such that their major axis is aligned substantially in the first direction X in an initial alignment state, and thus the liquid crystals LC may be maintained in a stabilized state. That is, the liquid crystals LC may be horizontally aligned in the initial alignment state. In the present specification, the "initial alignment state" refers to an alignment state of liquid crystals LC when an electric field is not applied to the liquid crystal layer 300. In some embodiments, the liquid crystal layer 300 may further include photocurable monomers (not shown), and the content of photocurable monomers may be about 100 ppm (parts per million) or less. When the content of photocurable monomers is 100 ppm or less, defective afterimages can be minimized.

Hereinafter, the first alignment-inducing layer 411 and the second alignment-inducing layer 421 will be described in detail with reference to FIGS. 4 and 5.

Figure 4:
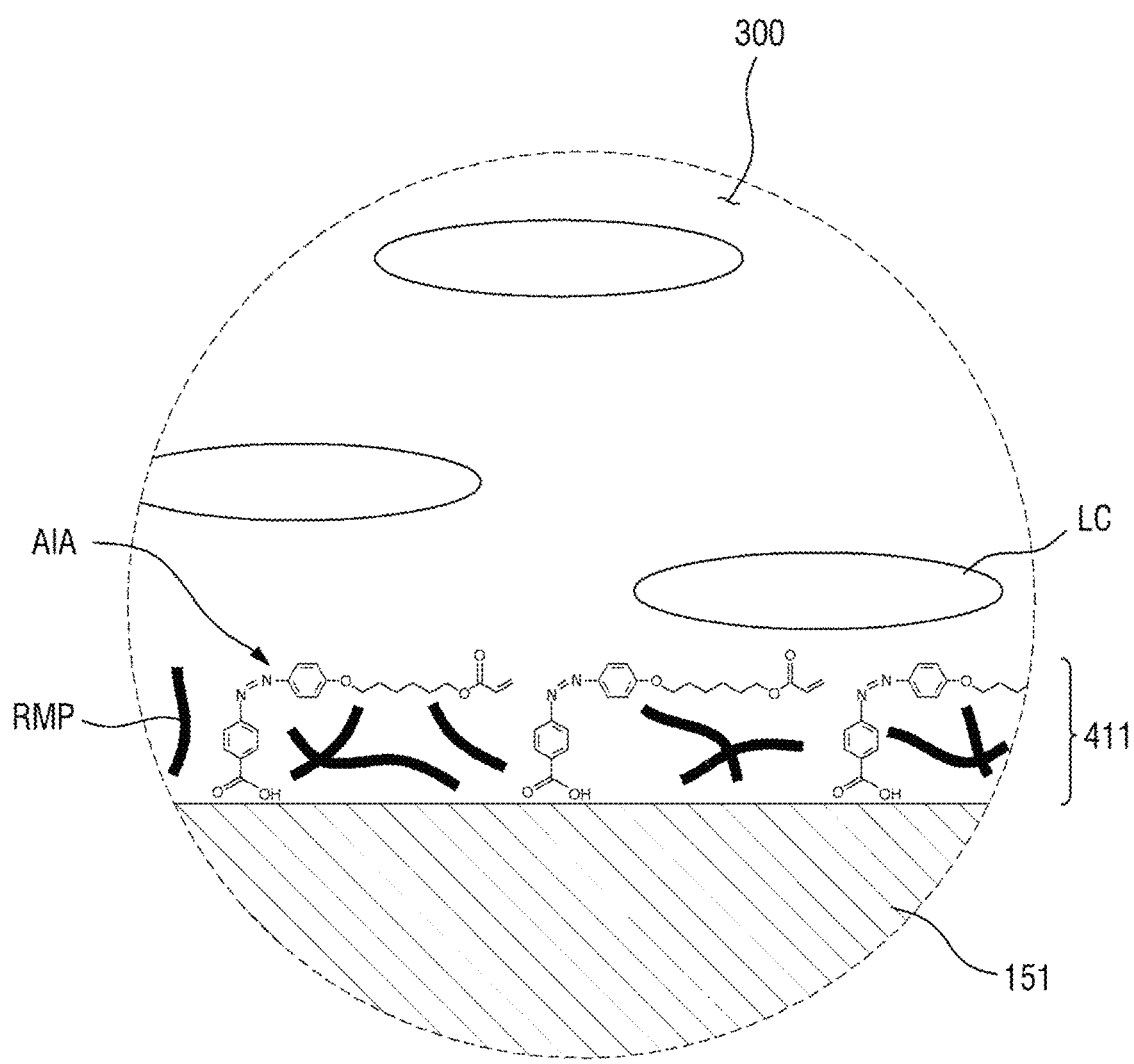
FIG. 4 is an enlarged cross-sectional view of area $AR_4$ of FIG. 3.

FIG. 4 is an enlarged cross-sectional view of area $AR_4$ of FIG. 3. FIG. 5 is an enlarged cross-sectional view of area $AR_5$ of FIG. 3.

Figure 5:
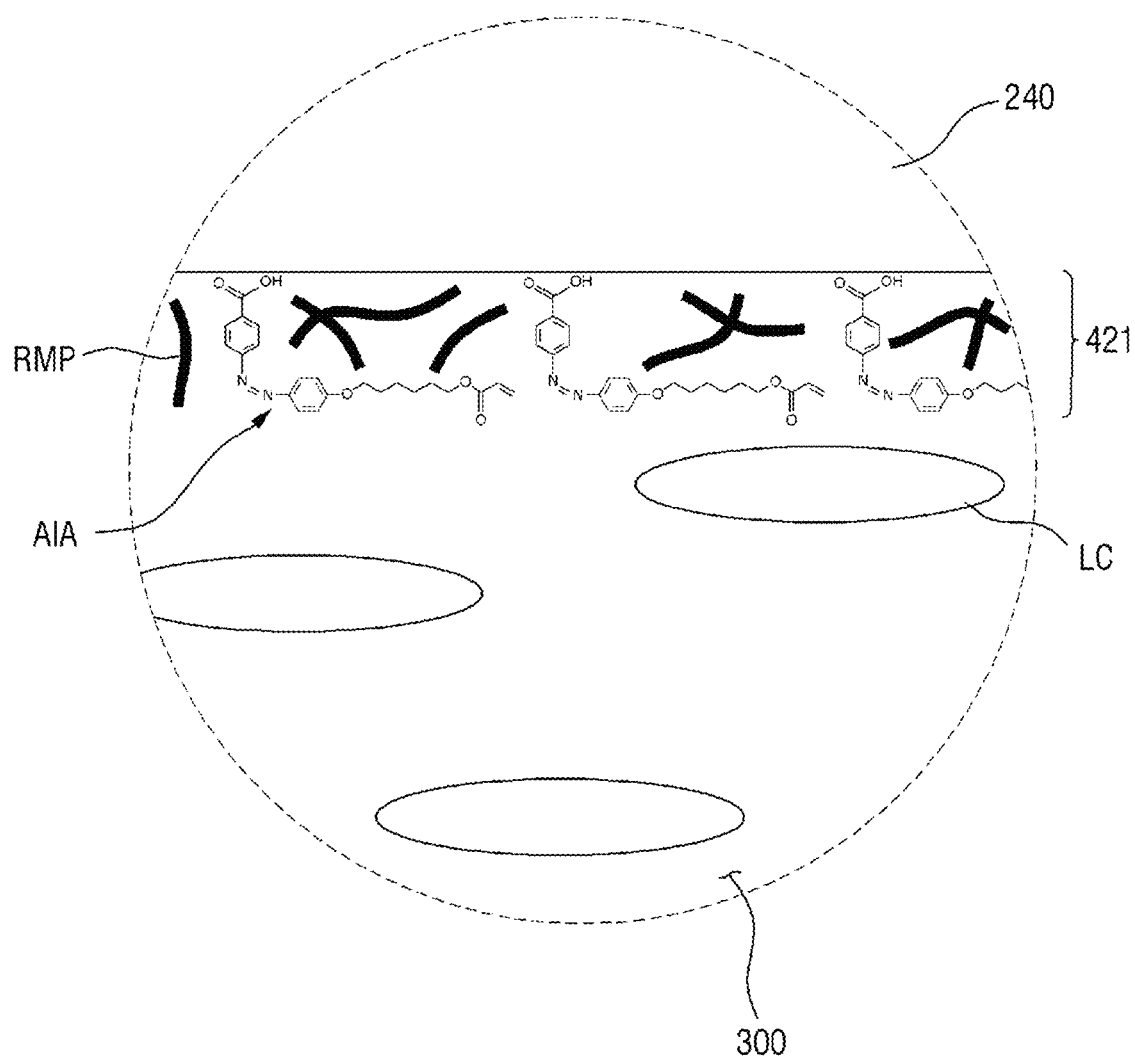
FIG. 5 is an enlarged cross-sectional view of area $AR_5$ of FIG. 3.

Referring to FIGS. 4 and 5, the first alignment-inducing layer 411 is disposed between the first display panel 100 and the liquid crystal layer 300, and the second alignment-inducing layer 421 is disposed between the second display panel 200 and the liquid crystal layer 300. In an exemplary embodiment, polymer alignment films, for example, polymer films including a branched chain polymer including an imide group as the repeat unit of a main chain, are not included between the first display panel 100 and the liquid crystal display 300 and between the second display panel 200 and the liquid crystal display 300. The first alignment-inducing layer 411 may be a monomolecular layer including a plurality of alignment inducing agents AIA arranged on the surfaces of the second insulating film 134 and the second electrode 151, and the second alignment-inducing layer 421 may be a monomolecular layer including a plurality of alignment inducing agents AIA arranged on the surface of the overcoat layer 240. Since the first alignment-inducing layer 411 and the second alignment-inducing layer 421 are substantially the same as each other except for a disposed position, hereinafter, the first alignment-inducing layer 411 will be described as an example, but the second alignment-inducing layer 421 may also be similarly understood.

The first alignment-inducing layer 411 includes alignment inducing agents AIA arranged on the surface of the first display panel 100. The alignment inducing agent MA may be a cis-isomer compound having an azobenzene group.

FIGS. 4 and 5 show a case where a compound represented by Chemical Formula 1-G (to be described later) is used as the alignment inducing agent AIA, but the present disclosure is not limited thereto. The alignment inducing agent MA may be a compound having a structure represented by Chemical Formula 1-A.

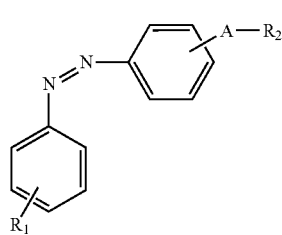

Chemical Formula 1-A

In Chemical Formula 1-A above, $R_1$ is a hydrophilic group, $R_2$ is a hydrogen atom,

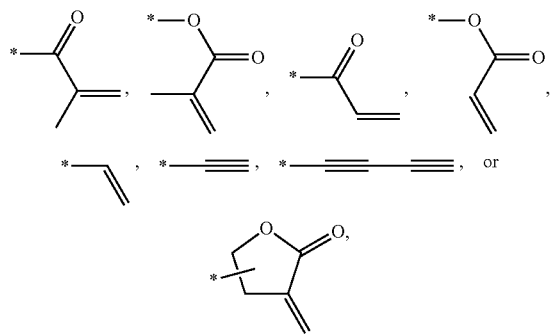

and A is an alkylene group of 1 to 20 carbon atoms, an alkyleneoxy group of 1 to 20 carbon atoms, or a single bond. Examples of the hydrophilic group may include

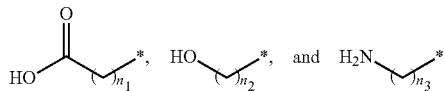

(here, $n_1$ is an integer of 0 to 2, and $n_2$ and $n_3$ are each independently an integer of 1 to 3). It is to be understood that when A is an alkyleneoxy group, then the oxy atom is not bonded to another atom, i.e., a peroxy group is not present.

The alignment inducing agent AIA having a structure represented by Chemical Formula 1-A above may be compound in a cis-isomer state where the two benzene rings are disposed in the same direction as each other based on the double bond of an azo group (*—N═N—*). The alignment inducing agent AIA may have only one azo group, so as to have a cis-structure at only one position. Further, the alignment inducing agent AIA has only two benzene rings, so as to minimize the volume of the alignment inducing agent MA in space and not hinder the alignment of an alignment inducing agent which is an adjacent cis-isomer state.

The hydrophilic group ($R_1$—*) on the end of the alignment inducing agent AIA having a structure represented by Chemical Formula 1-A above may be aligned in a direction toward the first display panel 100. That is, the hydrophilic group ($R_1$—*) of the alignment inducing agent AIA is aligned approximately perpendicular (i.e., substantially perpendicular) to the surface of the adjacent first display panel 100 to be maintained at a stabilized state. The hydrophilic group ($R_1$—*) of the alignment inducing agent AIA may form a hydrogen bond together with a hydrophilic group (for example, a hydroxyl group (—OH)), which is exposed on the surface of the second electrode 151 and/or on the surface of the second insulating layer 134 included in the first display panel 100. In an exemplary embodiment, the hydrophilic group ($R_1$—*) has a structure of 3 carbon atoms or less, 2 carbon atoms or less, or 1 carbon atom, so as to have relatively rigid properties and stably support the alignment inducing agent AIA on the surface of the first display panel 100.

The linking group and end group (*-A-$R_2$) of the alignment inducing agent AIA having a structure represented by Chemical Formula 1-A above, may be aligned in a direction parallel to the surface of the first display panel 100. That is, the linking group and end group (*-A-$R_2$) of the alignment inducing agent MA may be aligned in a direction approximately parallel (i.e., substantially parallel) to the first direction X, in order to be maintained at a stabilized state. In an exemplary embodiment, the linking group (*-A-*) has a straight chain or branched chain structure of 20 carbon atoms or less, 4 to 20 carbon atoms, or 6 carbon atoms, so as to have relatively flexible properties and exhibit hydrophobicity. Thus, the affinity of the alignment inducing agent AIA with liquid crystals LC can be increased, and the liquid crystals LC adjacent to the first alignment-inducing layer 411 can be initially horizontally aligned.

For example, the compound having a structure represented by Chemical Formula 1-A above may be a compound having a structure represented by Chemical Formula 1-B below.

Chemical Formula 1-B

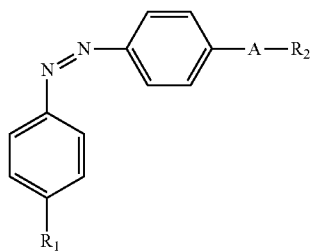

In Chemical Formula 1-B above, $R_1$, $R_2$, and A are the same as those defined in Chemical Formula 1-A.

A nitrogen atom and a hydrophilic group ($R_1$—*) are bonded at para positions on one of the benzene rings to make an approximately linear skeleton extending from the nitrogen (left N in Chemical Formula 1-B) to R1, and a nitrogen atom and a linking group (*-A-*) are bonded at para positions of the other benzene ring to make an approximately linear skeleton extending from the nitrogen (right N in Chemical Formula 1-B) to R2, thereby enabling more stable alignment.

For another example, the compound having a structure represented by Chemical Formula 1-A above may be a compound having a structure represented by Chemical Formula 1-C, Chemical Formula 1-D, Chemical Formula 1-E, or Chemical Formula 1-F below.

Chemical Formula 1-C

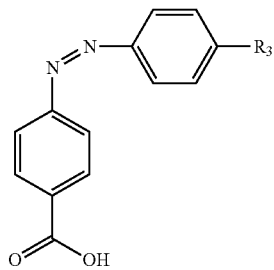

Chemical Formula 1-D

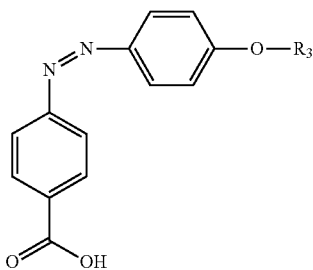

Chemical Formula 1-E

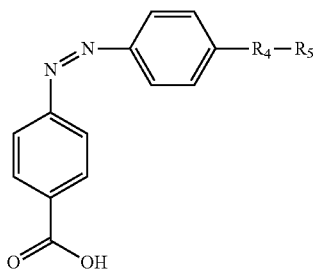

Chemical Formula 1-F

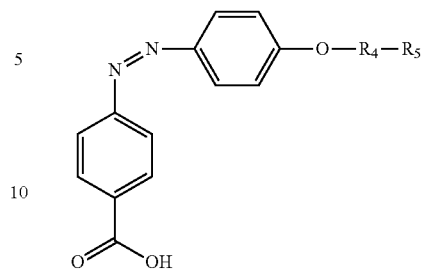

In Chemical Formulae 1-C and 1-D above, $R_3$ is an alkyl group of 1 to 20 carbon atoms. In Chemical Formulae 1-E and 1-F above, $R_4$ is an alkylene group of 1 to 20 carbon atoms, and $R_5$ is

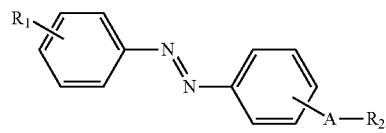

For another example, the compound having a structure represented by Chemical Formula 1-A above may be a compound having a structure represented by Chemical Formula 1-G.

Chemical Formula 1-G

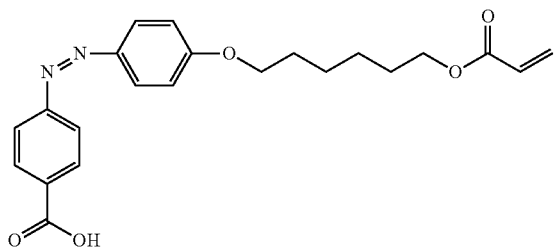

In some embodiments, the first alignment-inducing layer 411 may further include a trans-isomer compound having an azobenzene group. For example, the first alignment-inducing layer 411 may further include a compound represented by Chemical Formula 2-A below.

Chemical Formula 2-A

In Chemical Formula 2-A above, $R_1$, $R_2$ and A are the same as those defined in Chemical Formula 1-A.

The compound having a structure represented by Chemical Formula 2-A above may be a trans-isomer state where the two benzene rings are disposed in different directions from each other based on the double bond of the azo group. Although not shown in the drawings, the compound having a structure represented by Chemical Formula 2-A above may be aligned approximately perpendicular to the surface of the first display panel 100. For example, the hydrophilic group ($R_1$—*) of the compound may be aligned in a direction toward the first display panel 100. The hydrophilic group ($R_1$—*) of the compound may form a hydrogen bond together with a hydrophilic group, which is exposed on the surface of the second electrode 151 and/or on the surface of the second insulating layer 134 included in the first display panel 100. Further, the linking group and end group (*-A-$R_2$) of the compound having a structure represented by Chemical Formula 2-A above has affinity with liquid crystals LC to be aligned toward the liquid crystal layer 300, so as to be maintained at a stabilized state.

For example, the compound having a structure represented by Chemical Formula 2-A above may be a compound having a structure represented by Chemical Formula 2-B below.

Chemical Formula 2-B

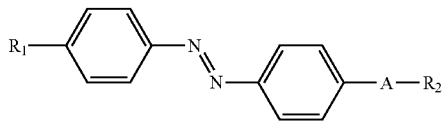

In Chemical Formula 2-B above, $R_1$, $R_2$ and A are the same as those defined in Chemical Formula 1-B.

A nitrogen atom and a hydrophilic group ($R_1$—*) are bonded at para positions of one benzene ring, and a nitrogen atom and a linking group (*-A-*) are bonded at para positions of the other benzene ring to make the compound having a structure represented by Chemical Formula 2-B above approximately linear.

For another example, the compound having a structure represented by Chemical Formula 2-A above may be a compound having a structure represented by Chemical Formula 2-C, Chemical Formula 2-D, Chemical Formula 2-E, or Chemical Formula 2-F below.

Chemical Formula 2-C

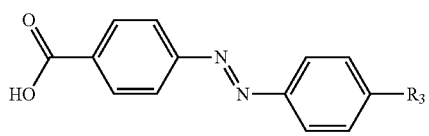

Chemical Formula 2-D

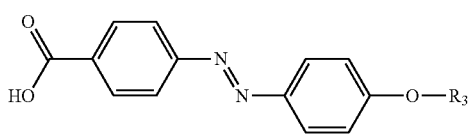

Chemical Formula 2-E

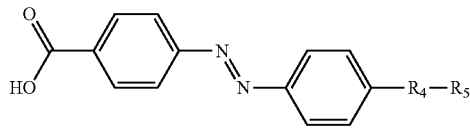

Chemical Formula 2-F

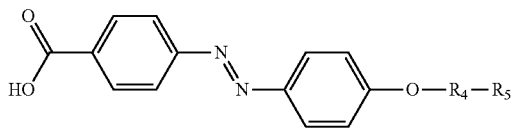

In Chemical Formulae 2-C, 2-D, 2-E, and 2-F above, $R_3$, $R_4$, and $R_5$ are the same as those defined in Chemical Formulae 1-C, 1-D, 1-E, and 1-F, respectively.

For another example, the compound having a structure represented by Chemical Formula 2-A above may be a compound having a structure represented by Chemical Formula 2-G below.

Chemical Formula 2-G

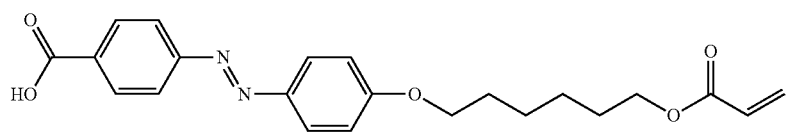

In some embodiments, the first alignment-inducing layer 411 may further include a photocurable polymer RMP. The photocurable polymer RMP may be adsorbed on the surfaces of the first display panel 100 and the second display panel 200 to form an alignment stabilizing layer. The photocurable polymer RMP is a polymer of photocurable monomers. For example, the photocurable monomer is a reactive mesogen, and the photocurable polymer thus may be a polymer of reactive mesogens. The photocurable polymers RMP are disposed on the surfaces of the first display panel 100 and the second display panel 200 to improve the alignment stability of the first and second alignment-inducing layers 411 and 421. FIGS. 4 and 5 illustrate a case where the photocurable polymers RMP are disposed between molecules of the alignment inducing agent AIA to support the alignment inducing agent AIA. However, the present disclosure is not limited thereto, and the alignment inducing agent AIA may cover the entire surface of a self-aligned alignment inducing agent (AIA) monomolecular layer.

As a non-limiting example, each of the first alignment-inducing layer 411 and the second alignment-inducing layer 421 may include the compound represented by Chemical Formula 1-A above, the compound represented by Chemical Formula 2-A above, and the photocurable polymer RMP. Additional polymer alignment films, for example, polymer films each including a branched polymer including an imide group in the repeat unit of a main chain thereof, are not included between the first display panel 100 and the liquid crystal display 300 and/or between the second display panel 200 and the liquid crystal display 300, thereby minimizing afterimage defects and reducing the cost for forming a polymer film.

Figure 6:
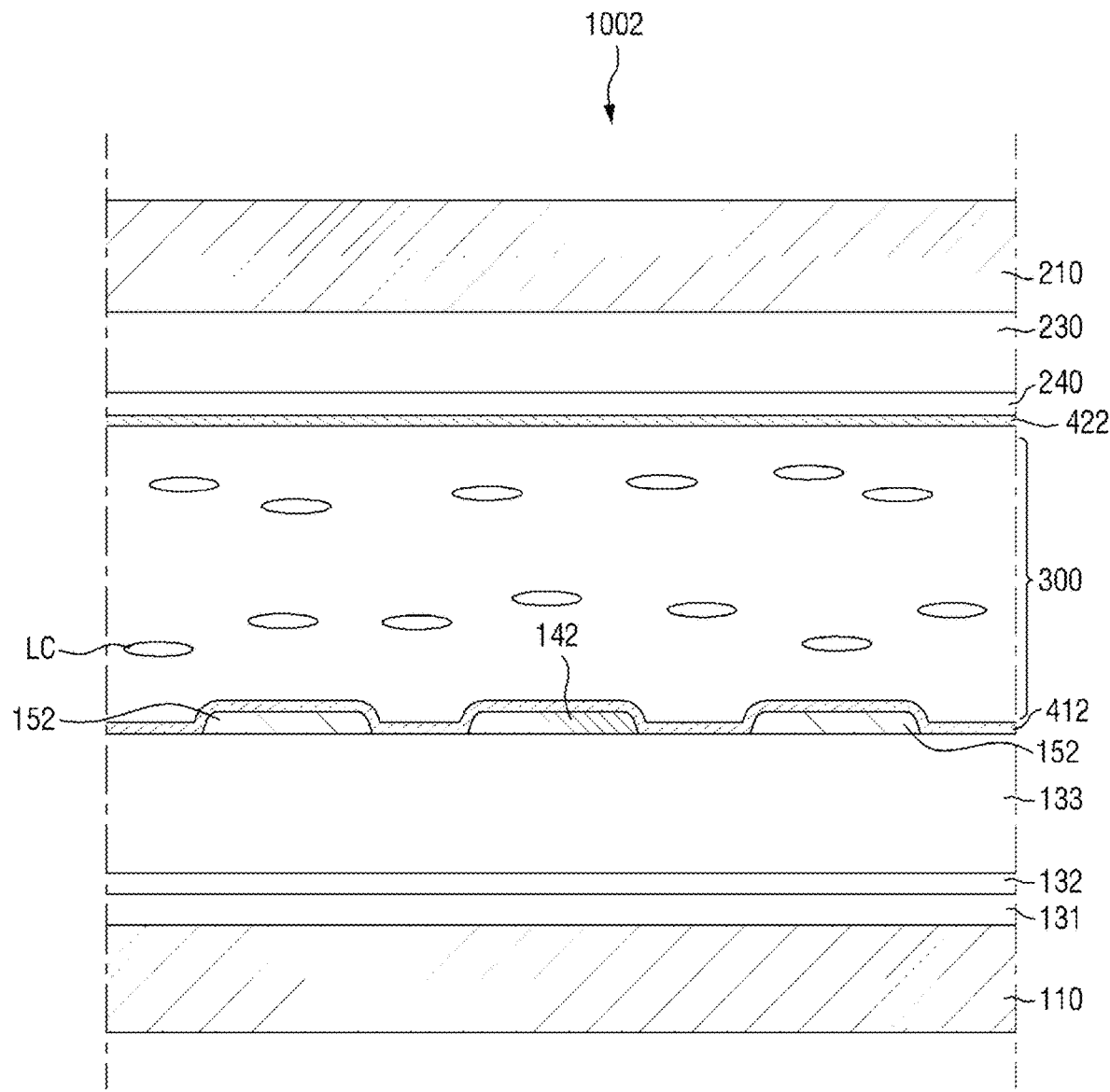
FIG. 6 is a cross-sectional view of a display device according to another embodiment.

FIG. 6 is a cross-sectional view of a display device according to another embodiment of the present disclosure.

The display device 1002 according to an embodiment of FIG. 6 is different from the display device 1001 according to an embodiment of FIG. 2 in that the first electrode 142 and second electrode 152 of the display device 1002 are insulated from each other on the first insulating substrate 110, but the first electrode 142 and second electrode 152 are disposed on the same layer. That is, the first alignment-inducing layer 412 may be a monomolecular layer including an alignment inducing agent arranged on the surfaces of the first electrode 142 and the second electrode 152. Liquid crystals LC may have positive dielectric anisotropy, and may be horizontally aligned in an initial alignment state. In another embodiment, liquid crystals LC may also have negative dielectric anisotropy.

Hereinafter, a method of manufacturing a display device according to an embodiment of the present disclosure will be described.

Figure 7:
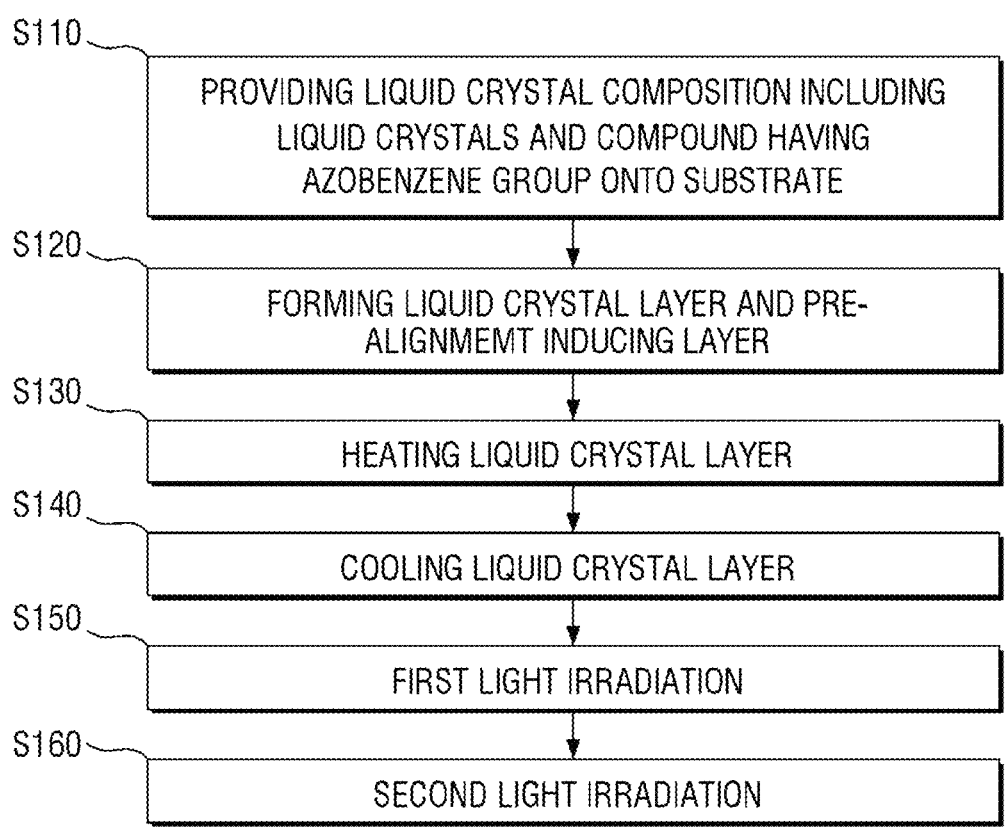
FIG. 7 is a flowchart showing a method of manufacturing a display device according to an embodiment.

FIG. 7 is a flowchart showing a method of manufacturing a display device according to an embodiment of the present disclosure.

Referring to FIG. 7, the method of manufacturing a display device according to an embodiment includes the steps of: providing (i.e., applying) a liquid crystal composition including liquid crystals and a compound having an azobenzene group onto a panel (i.e., a substrate) (S110); forming a liquid crystal layer and a pre-alignment inducing layer (S120); heating the liquid crystal layer (S130); cooling the liquid crystal layer (S140); primarily irradiating the liquid crystal layer with light (S150); and secondarily irradiating the liquid crystal layer with light (S160).

FIGS. 8 to 19 are cross-sectional views showing the method of manufacturing a liquid crystal display device of FIG. 7 in a stepwise manner.

Figure 8:
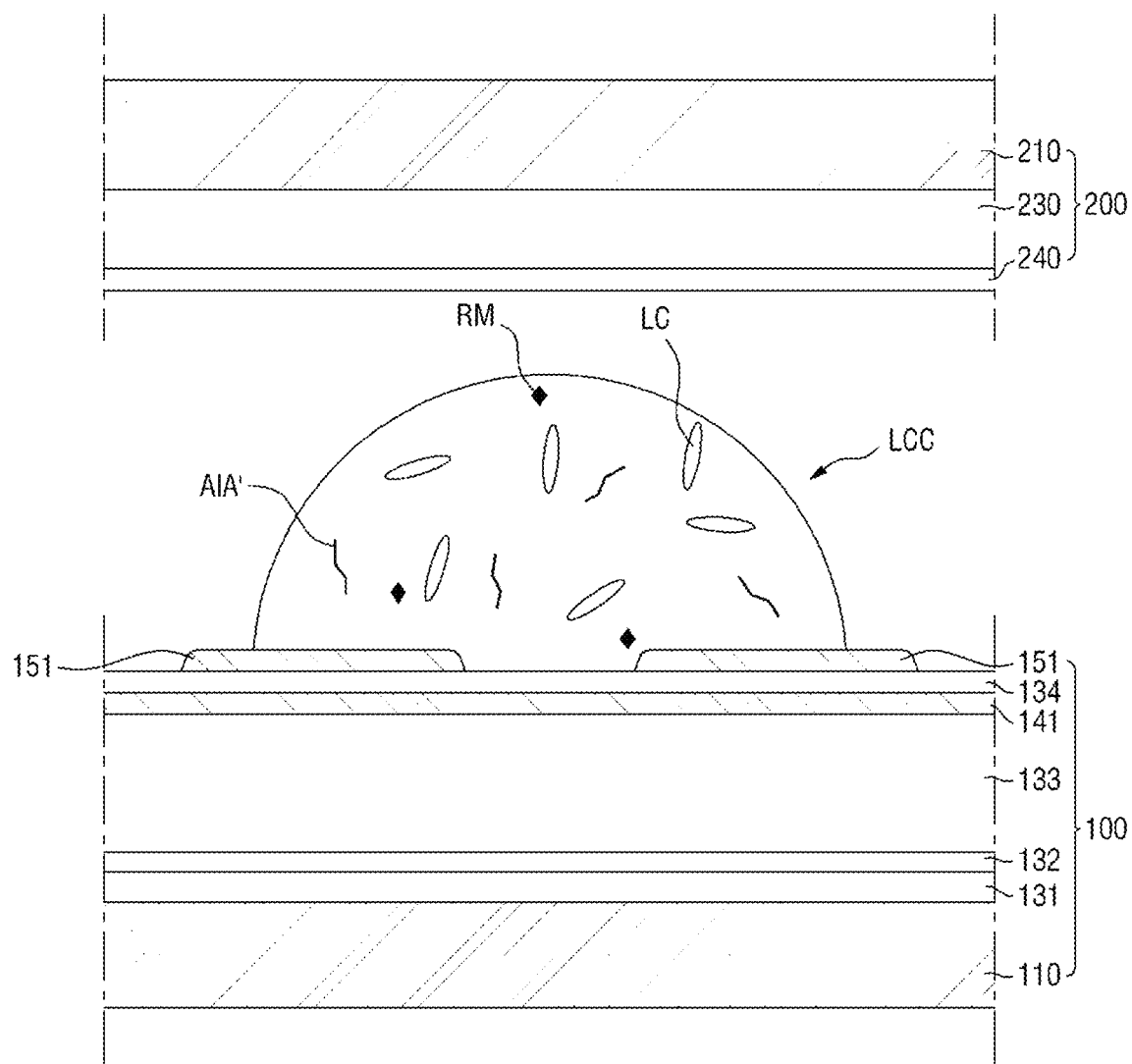
FIGS. 8 to 19 are cross-sectional views showing a method of manufacturing a liquid crystal display device of FIG. 7 in a stepwise manner.
Figure 9:
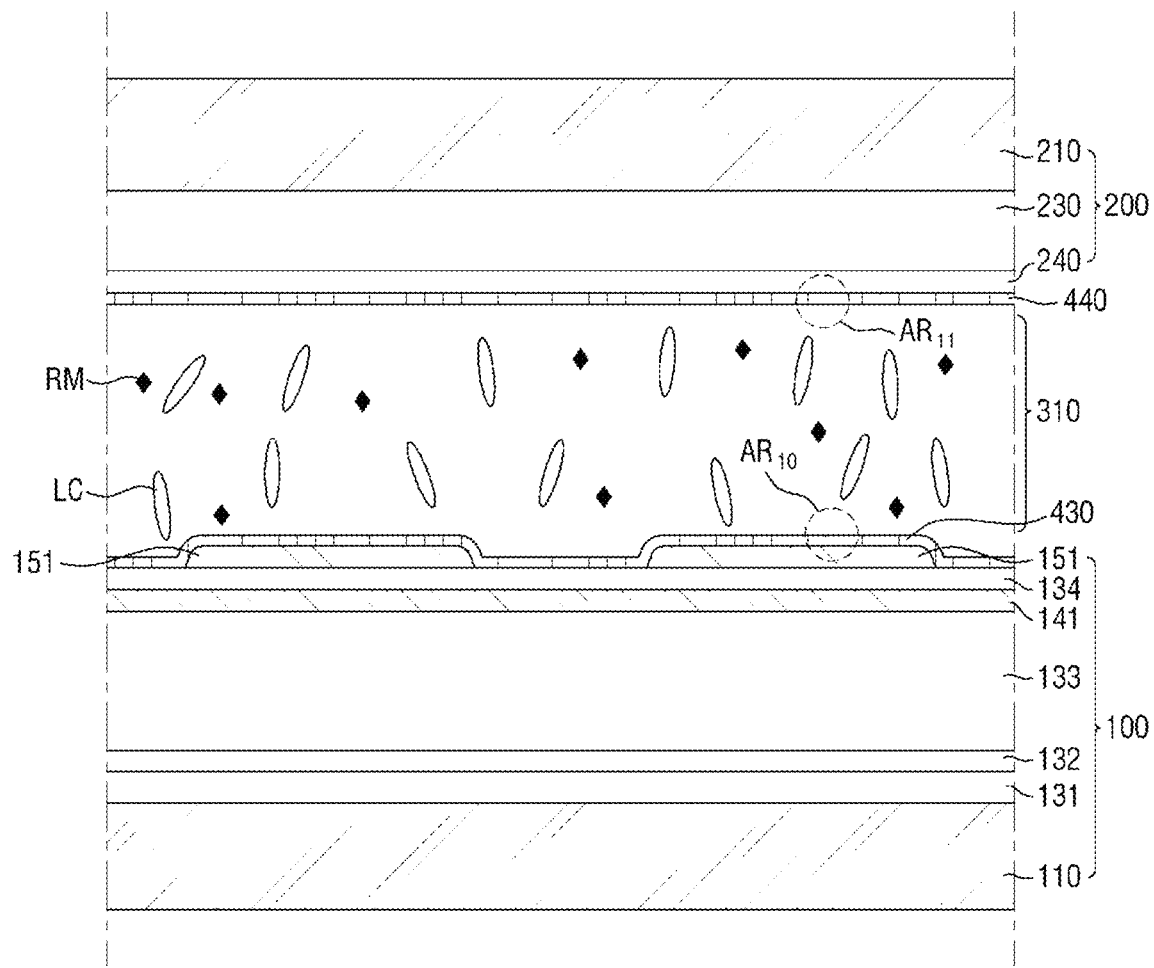
Figure 10:
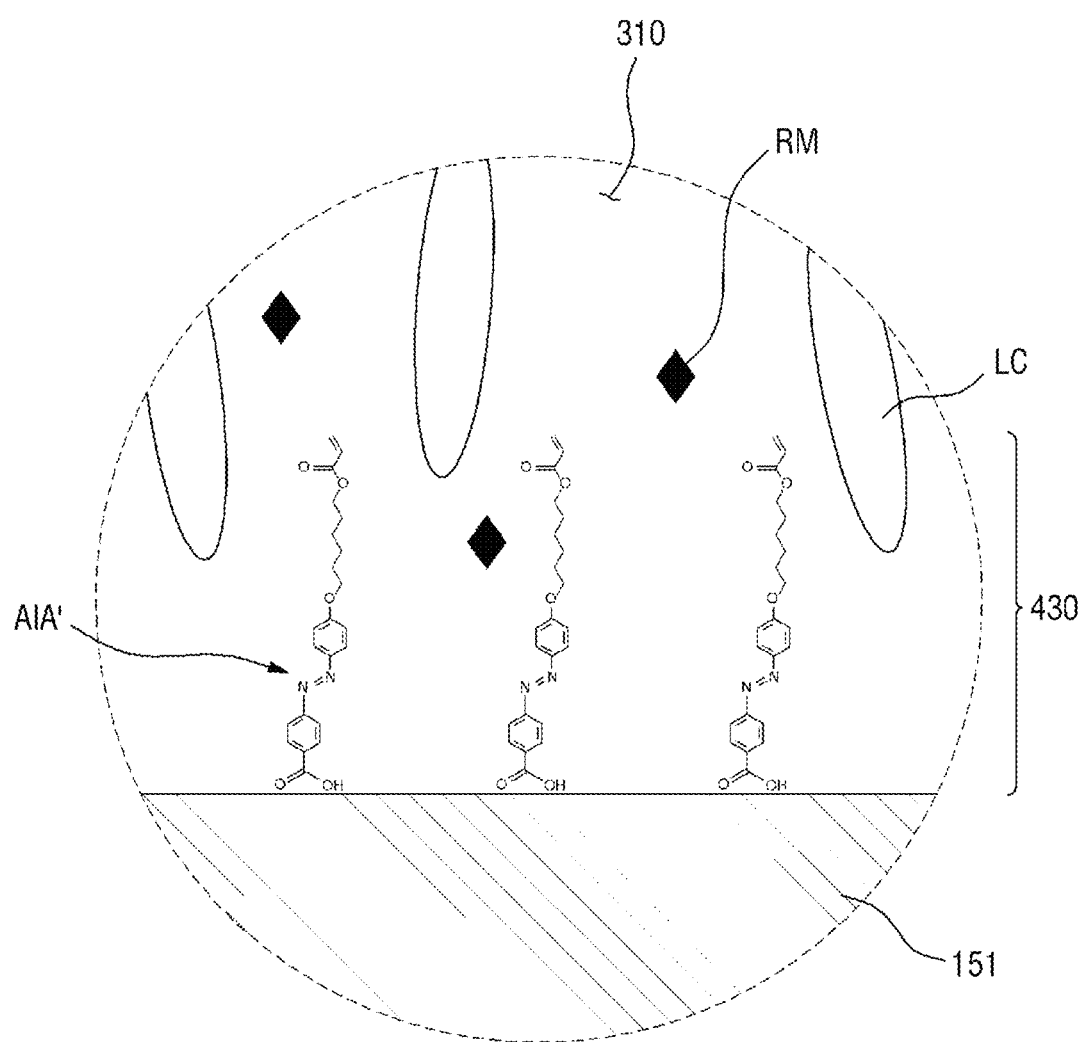
Figure 11:
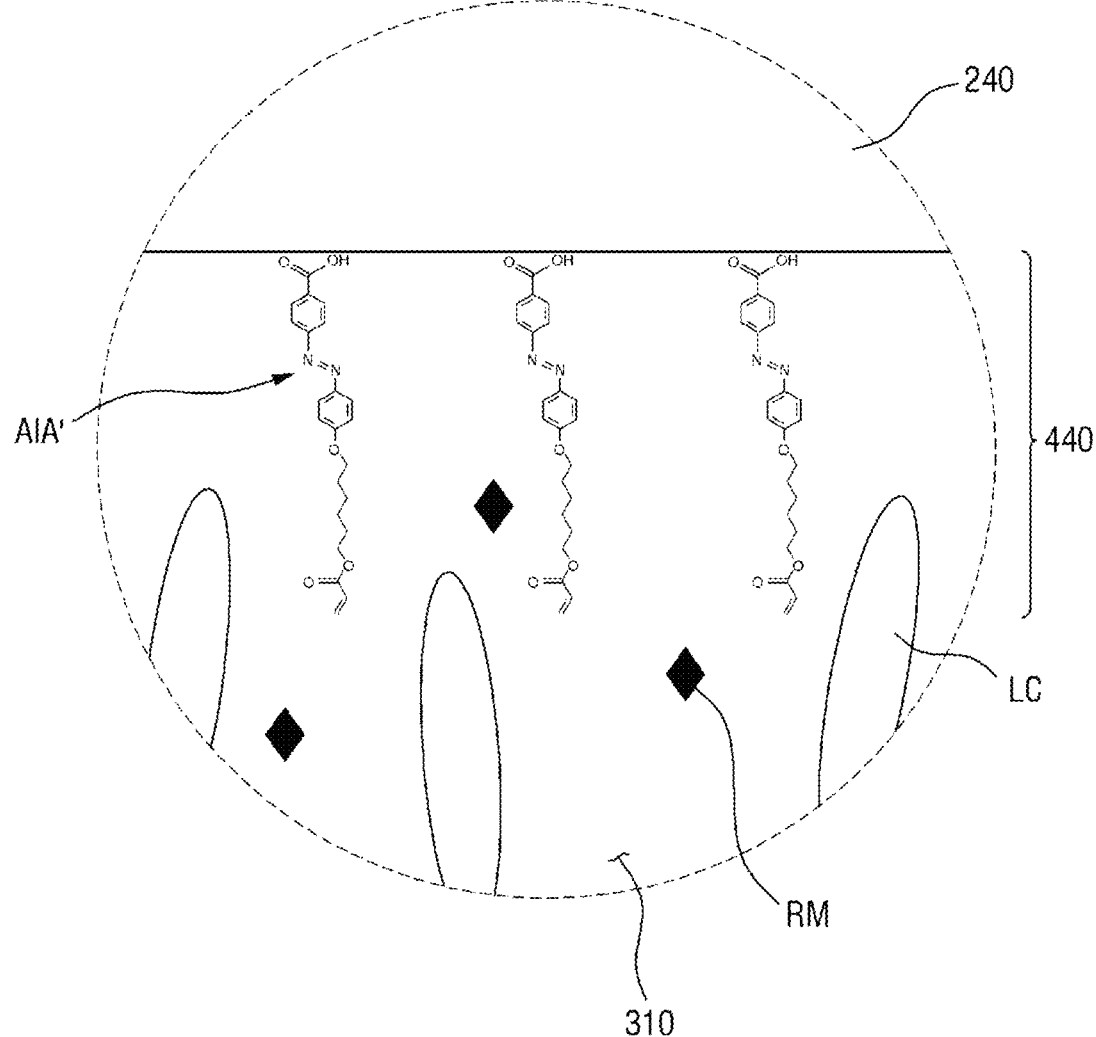
Figure 12:
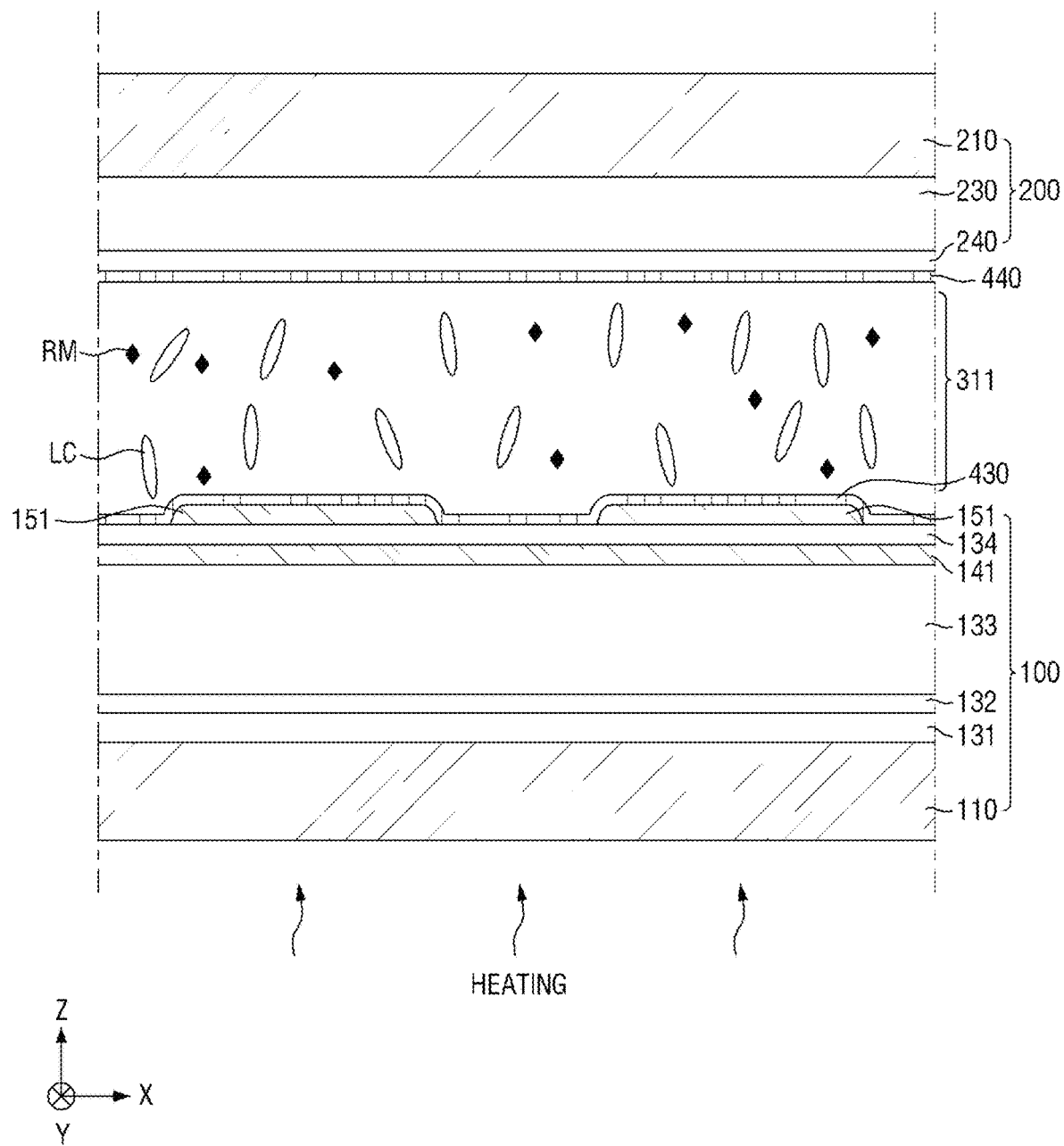
Figure 13:
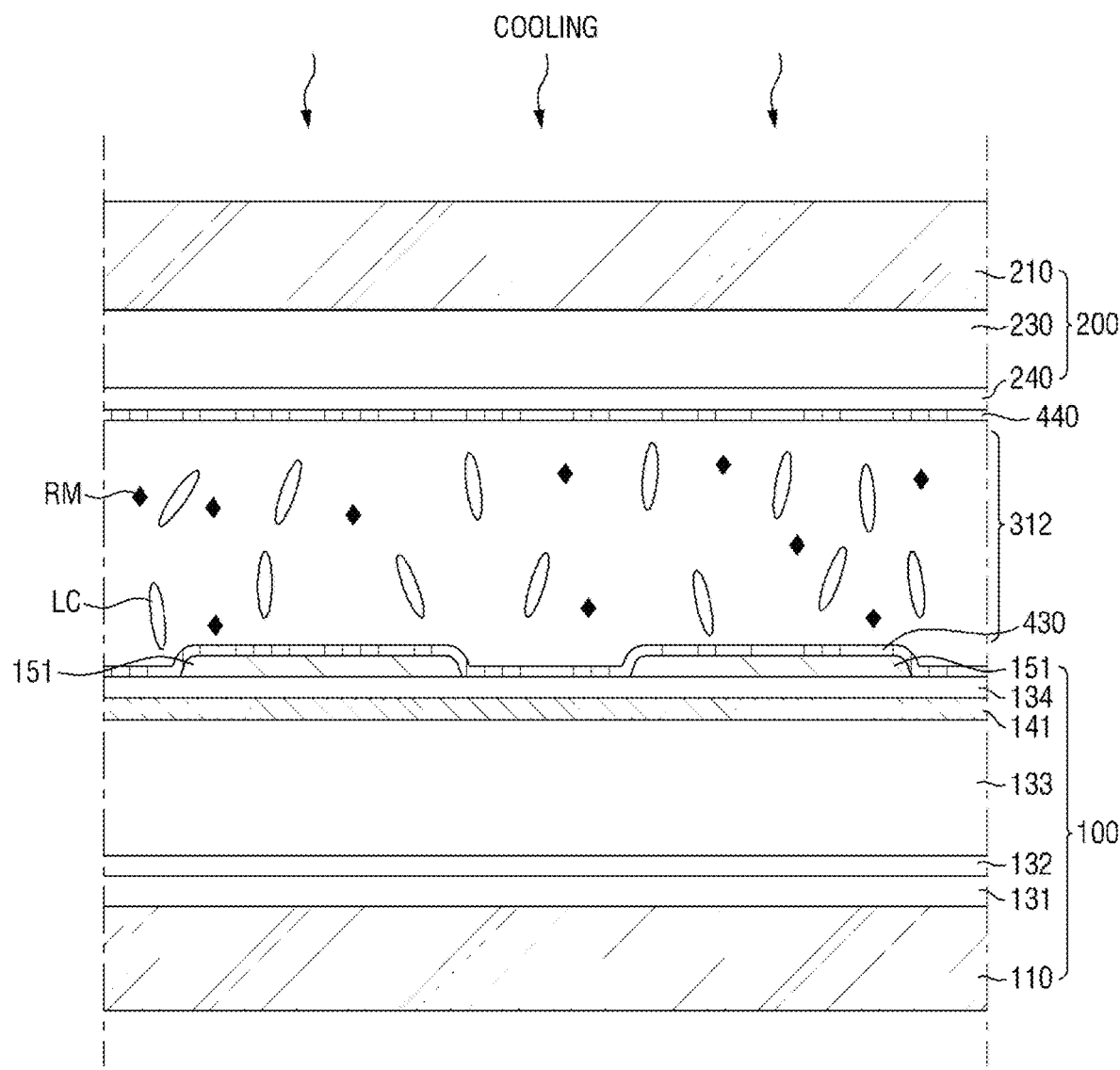
Figure 14:
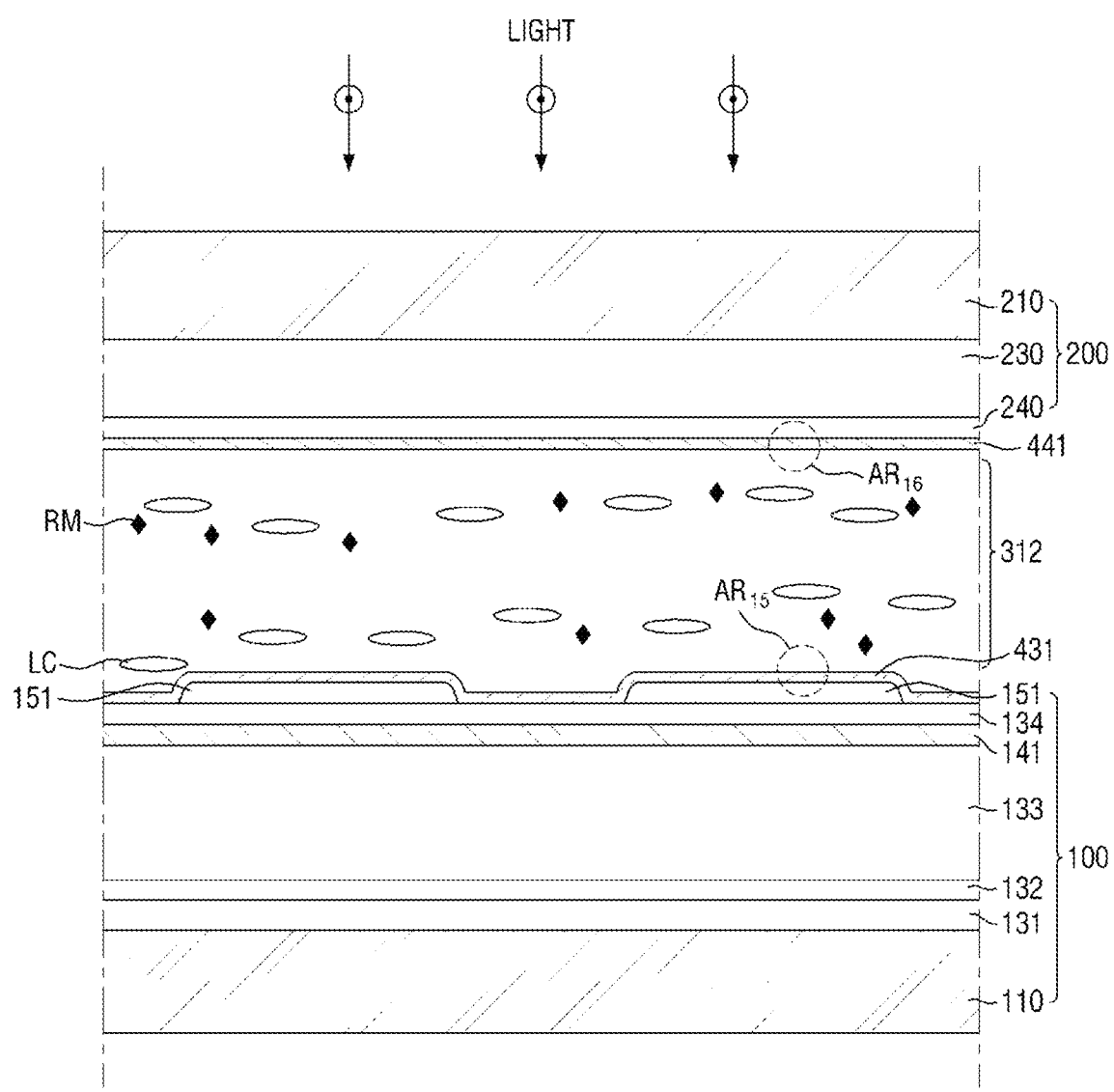
Figure 15:
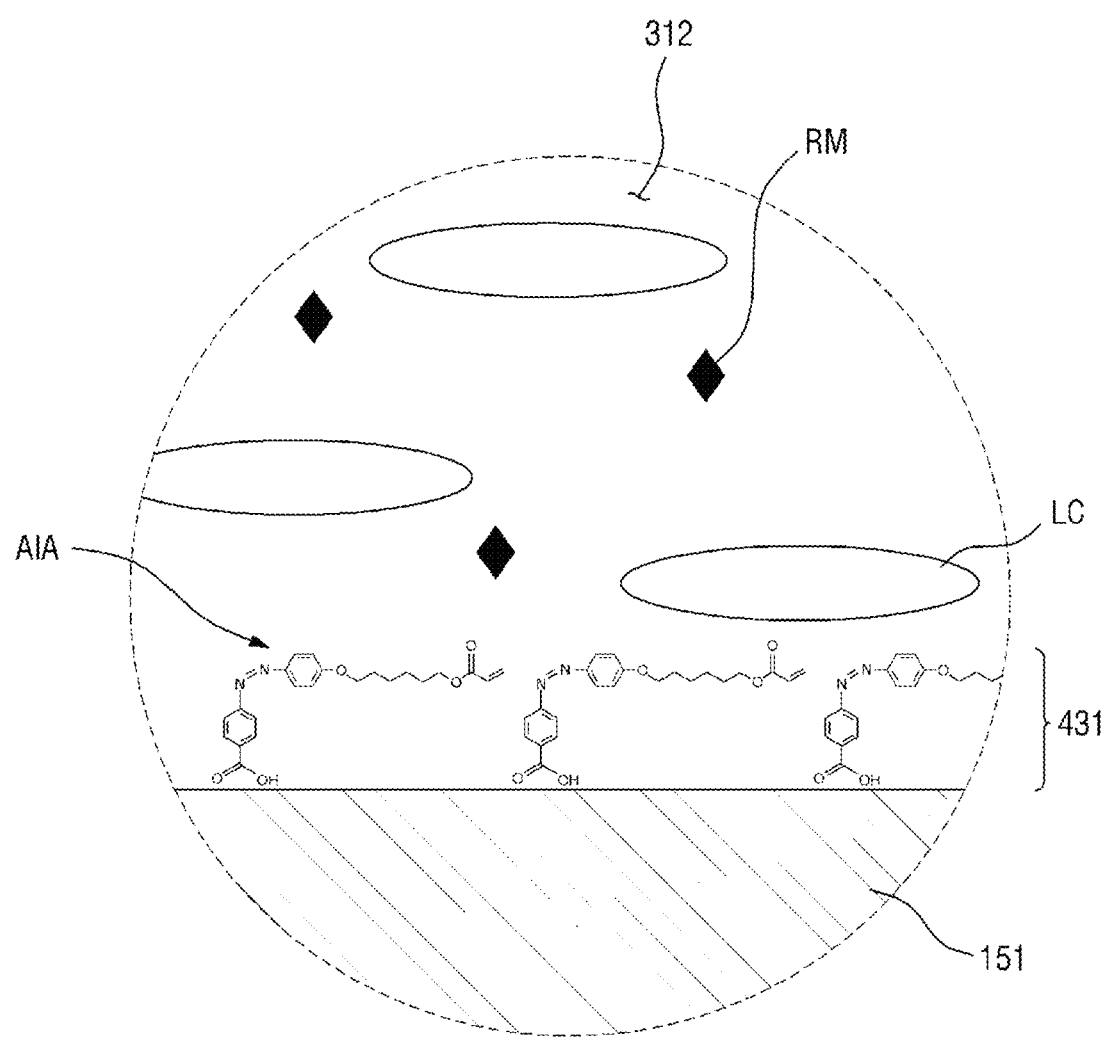
Figure 16:
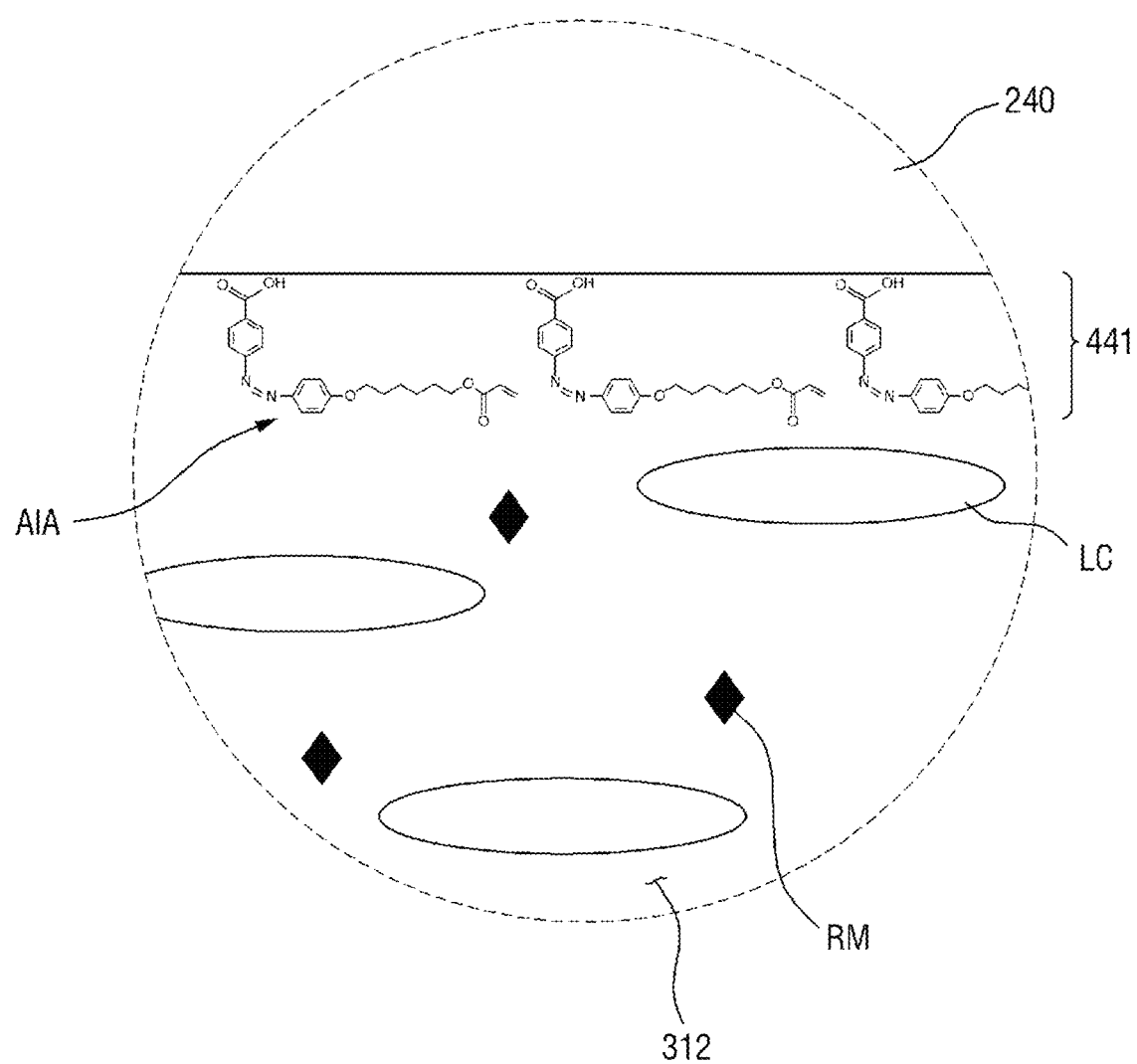
Figure 17:
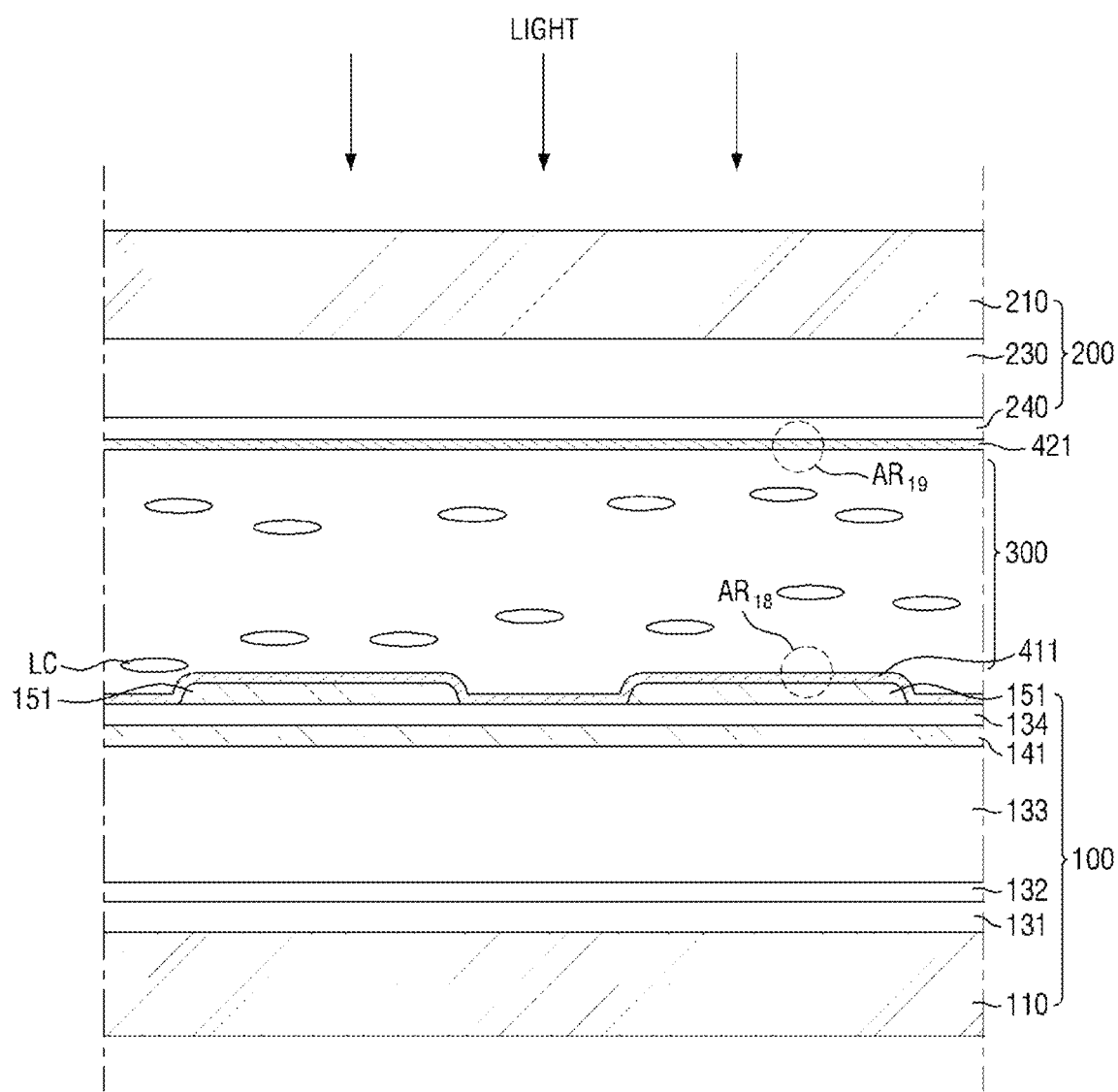
Figure 18:
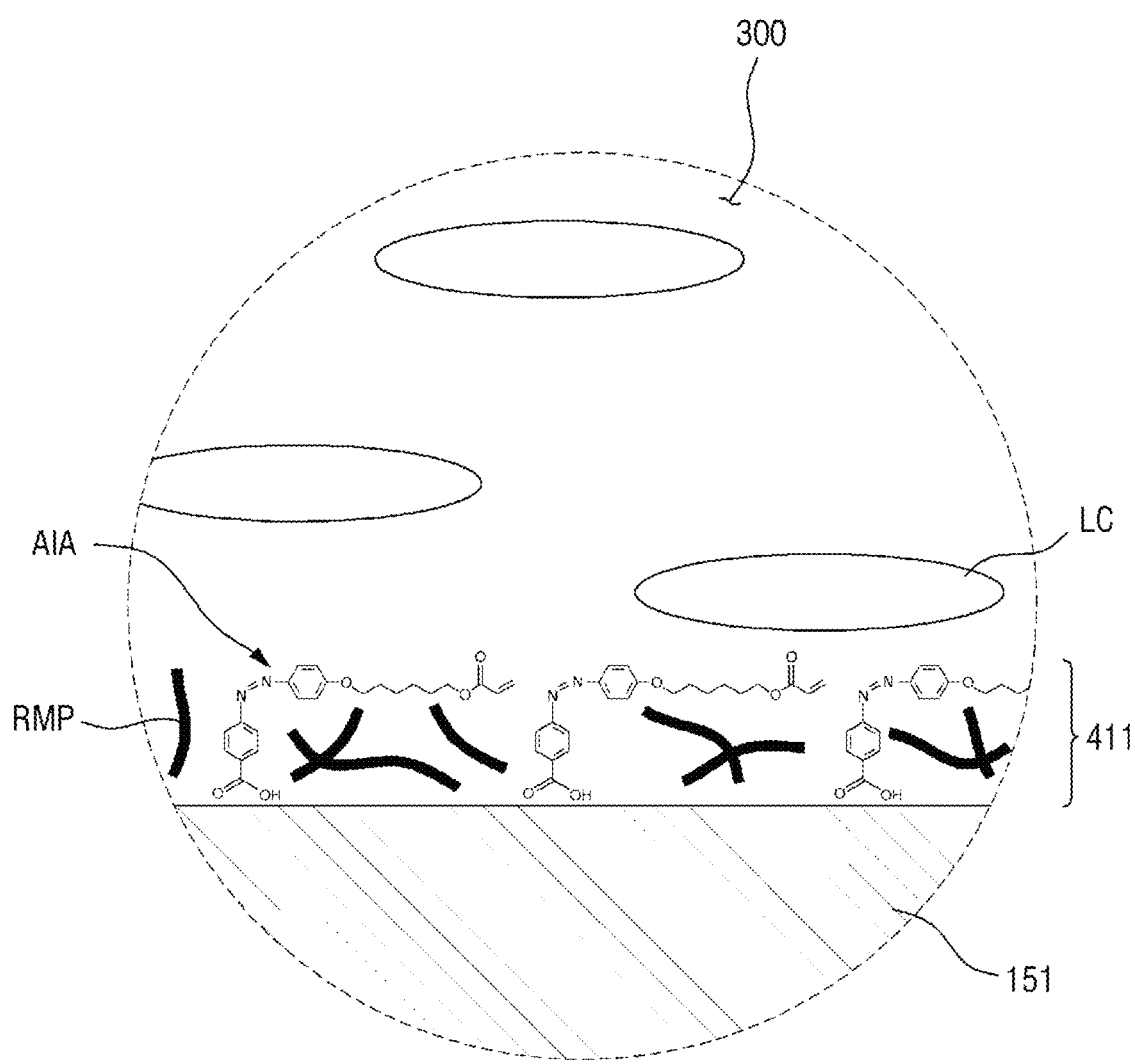
Figure 19:
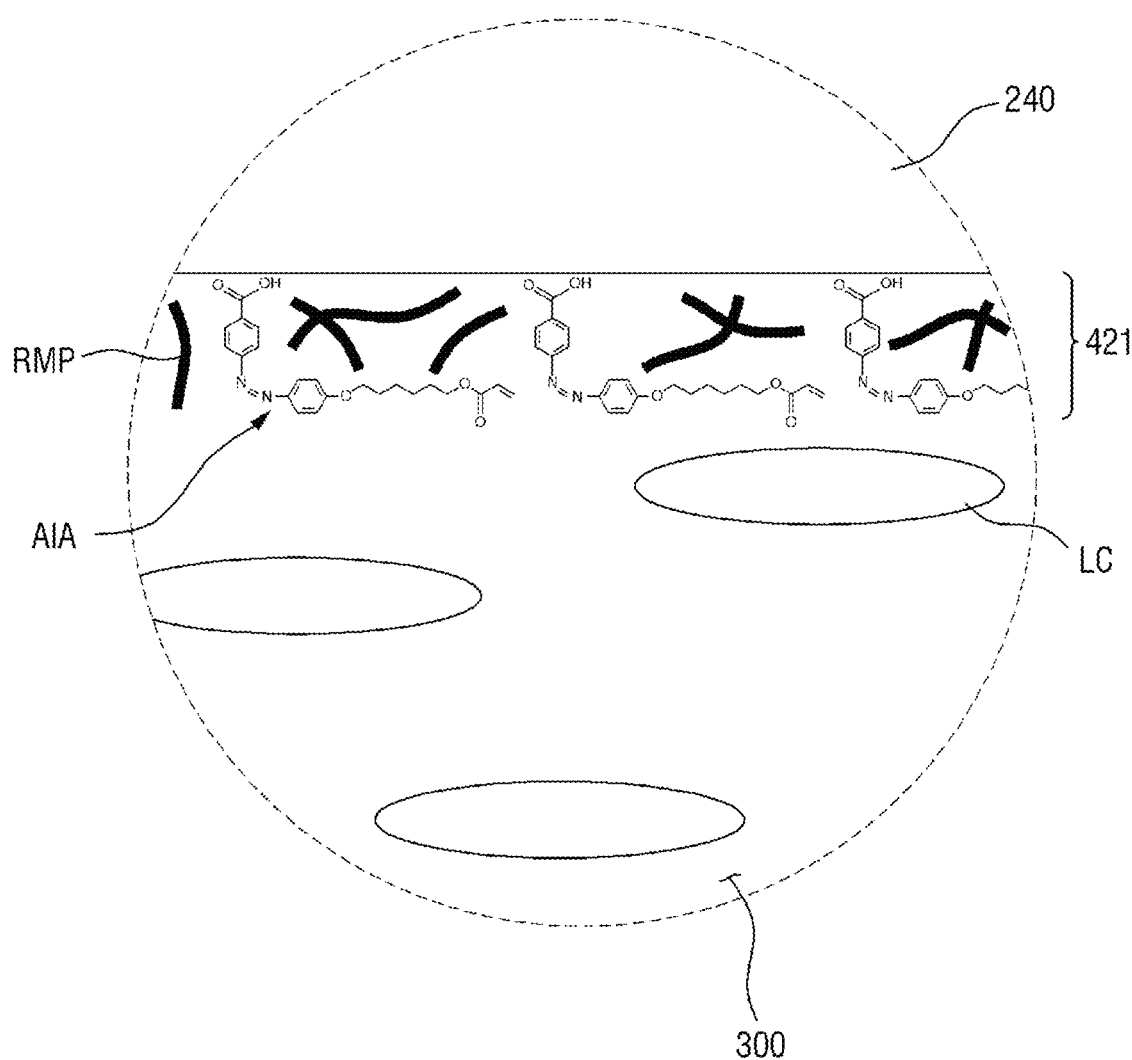

Specifically, FIG. 8 is a cross-sectional view showing the step (S110) of applying a liquid crystal composition onto a panel. FIG. 9 is a cross-sectional view showing the step (S120) of forming a liquid crystal layer and a pre-alignment inducing layer, FIG. 10 is an enlarged cross-sectional view of the area $AR_{10}$ of FIG. 9, and FIG. 11 is an enlarged cross-sectional view of the area $AR_{11}$ of FIG. 9. FIG. 12 is a cross-sectional view showing the step (S130) of heating the liquid crystal layer, and FIG. 13 is a cross-sectional view showing the step (S140) of cooling the liquid crystal layer. FIG. 14 is a cross-sectional view showing the step (S150) of primarily irradiating the liquid crystal layer with light, FIG. 15 is an enlarged cross-sectional view of the area $AR_{15}$ of FIG. 14, and FIG. 16 is an enlarged cross-sectional view of the area $AR_{16}$ of FIG. 14. FIG. 17 is a cross-sectional view showing the step (S160) of secondarily irradiating the liquid crystal layer with light, FIG. 18 is an enlarged cross-sectional view of the area $AR_{18}$ of FIG. 17, and FIG. 19 is an enlarged cross-sectional view of the area $AR_{19}$ of FIG. 17.

First, referring to FIGS. 7 and 8, a liquid crystal composition LCC is provided (i.e., applied) onto a panel (S110). The step (S110) of applying the liquid crystal composition LCC onto the panel may be a step of applying the liquid crystal composition LCC between the first display panel 100 and the second display panel 200.

The first display panel 100 may be a panel provided with a switching element 120, and the second display panel 200 may be a counter panel. Since the first display panel 100 and the second display panel 200 have been described with reference to FIG. 3, a description thereof will be omitted.

The liquid crystal composition LCC includes a plurality of liquid crystals LC, and a trans-isomer compound AIA' having an azobenzene group, which is uniformly dispersed in the liquid crystal composition LCC. The liquid crystal composition LCC may further include a photocurable monomer RM and a photoinitiator (not shown). In an exemplary embodiment, the liquid crystals LC and the liquid crystal composition LCC may have positive dielectric anisotropy, and the trans-isomer compound MA' having an azobenzene group may be a pre-alignment inducing agent for horizontal alignment. In another embodiment, the liquid crystals LC and the liquid crystal composition LCC may have negative dielectric anisotropy.

FIG. 10, to be further described later, shows a case where a compound having a structure represented by Chemical Formula 2-G is used as the trans-isomer compound MA' having an azobenzene group. However, the present disclosure is not limited thereto, and the trans-isomer compound AIA' having an azobenzene group, that is, the pre-alignment inducing agent AIA' may be a compound having a structure represented by Chemical Formula 2-A below.

Chemical Formula 2-A

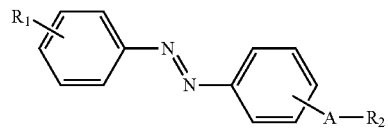

In Chemical Formula 2-A above, $R_1$ is a hydrophilic group, $R_2$ is a hydrogen atom,

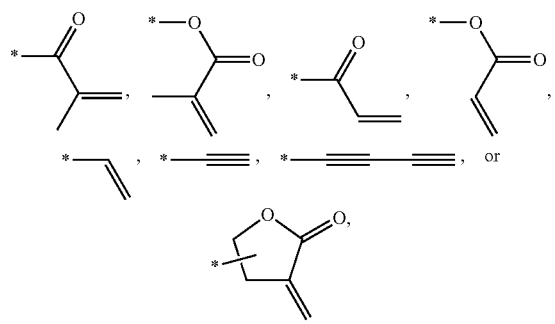

and A is an alkylene group of 1 to 20 carbon atoms, an alkyleneoxy group of 1 to 20 carbon atoms, or a single bond. Examples of the hydrophilic group may include

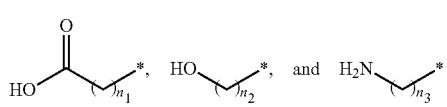

(here, $n_1$ is an integer of 0 to 2, and $n_2$ and $n_3$ are each independently an integer of 1 to 3).

The pre-alignment inducing agent MA' having a structure represented by Chemical Formula 2-A above may be in a trans-isomer state where two benzene rings are disposed in different directions from each other based on the double bond of the azo group. As will be described later, the azo group of the pre-alignment inducing agent AIA' having a structure represented by Chemical Formula 2-A above can be trans-cis-isomerized by absorbing light of a specific wavelength.

The molecular weight of the pre-alignment inducing agent AIA' having a structure represented by Chemical Formula 2-A above may be about 200 grams per mole (g/mol) to about 650 g/mol, or about 300 g/mol to about 450 g/mol. When the molecular weight thereof is about 200 g/mol or greater, the liquid crystals can be initially stably horizontally aligned, and when the molecular weight thereof is about 650 g/mol or less, sufficient solubility can be imparted to an alignment-inducing agent compound. Further, the solubility of the pre-alignment inducing agent AIA' to the liquid crystals at 25° C. may be about 0.01 wt % to about 0.2 wt %. When the solubility thereof is about 0.2 wt % or less, the initial alignment of the liquid crystals can be easily initiated while minimizing defective alignment, the alignment state of the liquid crystals has a relatively high stability to heat and light after the initial alignment of the liquid crystals, and the occurrence of aggregation of particles of the alignment inducing agent can be minimized. Further, the hindrance of photopolymerization can be minimized during the process of polymerizing the photocurable monomers (to be described later). In the present specification, the "solubility" refers to the maximum amount of a dopant material (for example, the pre-alignment inducing agent) that can be dissolved in host material (for example, the liquid crystals) at a temperature of 25° C.

The pre-alignment inducing agent MA' may be contained in an amount of about 0.01 wt % to about 1.0 wt % based on the total weight of the liquid crystal composition LCC. When the content of the pre-alignment inducing agent AIA' is 0.01 wt % or greater, the alignment-inducing layer has monomolecular density which is sufficient for horizontally aligning and stabilizing the liquid crystals. When the content thereof is 0.1 wt % or less, the monomolecular density of the alignment inducing layer is not excessive, and thus alignment stability can be maintained even after a cis-isomerization reaction.

For example, the pre-alignment inducing agent AIA' having a structure represented by Chemical Formula 2-A above may be a compound having a structure represented by Chemical Formula 2-B below.

Chemical Formula 2-B

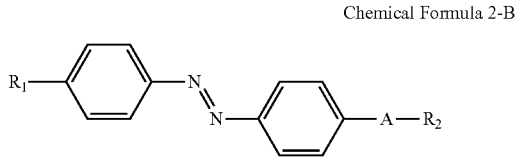

In Chemical Formula 2-B above, $R_1$, $R_2$, and A are the same as those defined in Chemical Formula 1-B.

For another example, the pre-alignment inducing agent MA' having a structure represented by Chemical Formula 2-A above, may be a compound having a structure represented by Chemical Formula 2-C, Chemical Formula 2-D, Chemical Formula 2-E, or Chemical Formula 2-F below.

Chemical Formula 2-C

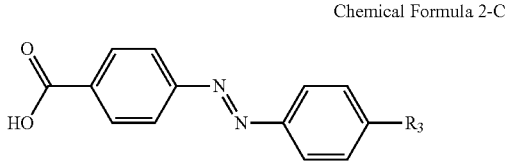

Chemical Formula 2-D

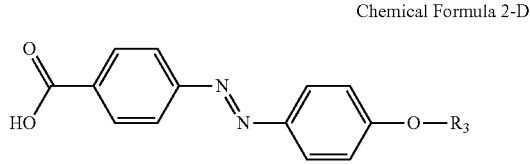

Chemical Formula 2-E

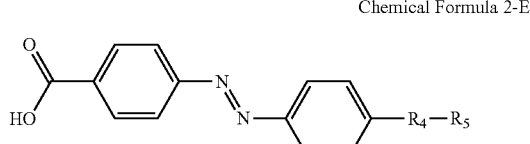

Chemical Formula 2-F

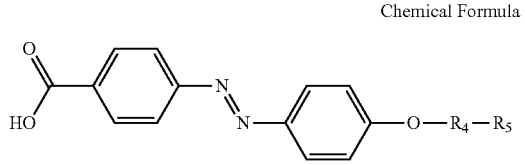

In Chemical Formulae 2-C and 2-D above, $R_3$ is an alkyl group of 1 to 20 carbon atoms. In Chemical Formulae 1-E and 1-F above, $R_4$ is an alkylene group of 1 to 20 carbon atoms, and $R_5$ is

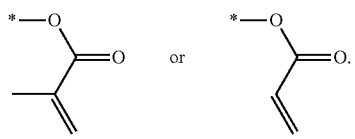

For another example, the pre-alignment inducing agent AIA' having a structure represented by Chemical Formula 2-A above, may be a compound having a structure represented by Chemical Formula 2-G below.

Chemical Formula 2-G

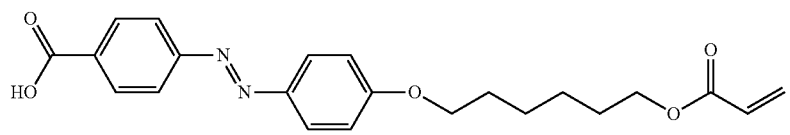

The photocurable monomer RM refers to a compound including a mesogen core structure for expressing liquid crystallinity as a rigid group and having at least one polymerizable end group for polymerization. The photocurable monomers RM may be polymerized into a polymer by absorbing light of a specific wavelength band. For example, the photocurable monomer RM may be a reactive mesogen.

Examples of the mesogen core structure of the photocurable monomer RM may include hydrocarbons including substituted or unsubstituted aromatic or alicyclic compounds of 6 to 30 carbon atoms, and substituted or unsubstituted heterorings of 6 to 30 carbon atoms. Further, examples of the end group may include

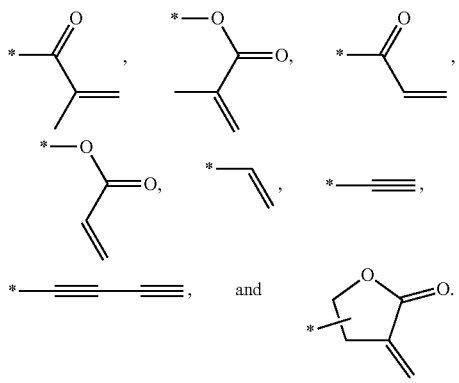

The photocurable monomer RM may be contained in an amount of about 0.01 wt % to about 2.0 wt % based on the total weight of the liquid crystal composition LCC. When the content of the photocurable monomer RM is about 0.01 wt % or more, an alignment stabilizing layer capable of further improving the stability of the alignment inducing layer to heat and light can be effectively formed. When the content thereof is about 2.0 wt % or less, it is possible to prevent the formation of defective afterimages due to the presence of unreacted photocurable monomers.

FIG. 8 illustrates a case where a drop of the liquid crystal composition LCC is deposited onto the first display panel 100, and then the second display panel 200 is attached to the first display panel 100. However, there may a case where the first display panel 100 is attached to the second display panel 200, and then the liquid crystal composition LCC is injected therebetween.

Subsequently, referring to FIGS. 7 and 9 to 11, a liquid crystal layer 310 and pre-alignment inducing layers 430 and 440 are formed (S120). The pre-alignment inducing agent AIA' which is uniformly dispersed in the liquid crystal composition LCC, may be self-aligned on the surface of the first display panel 100 due to the chemical interaction (for example, formation of a hydrogen bond) with the first display panel 100 and the second display panel 200, to form a first pre-alignment inducing layer 430, and may be self-aligned on the surface of the second display panel 200 to form a second pre-alignment inducing layer 440. Further, the pre-alignment inducing agent MA' uniformly dispersed in the liquid crystal composition LCC may serve as a surfactant for reducing interfacial energy at the interfaces between the liquid crystal layer 310 and the surface of the first display panel 100 and between the liquid crystal layer 310 and the surface of the second display panel 200. Thus, the hydrophilic group of the pre-alignment inducing agent AIA' may be adsorbed on the surfaces of the first display panel 100 and the surface of the second display panel 200.

The pre-alignment inducing agent MA' having a structure represented by Chemical Formula 2-A above, is aligned approximately perpendicular to the surfaces of the first display panel 100 and the second display panel 200 to be maintained in a stabilized state. For example, the hydrophilic group ($R_1$—*) of the pre-alignment inducing agent AIA' may form a hydrogen bond together with the hydrophilic groups exposed on the surfaces of the first display panel 100 and the second display panel 200. The hydrophilic group ($R_1$—*) has a structure of 3 carbon atoms or less, 2 carbon atoms or less, or 1 carbon atom to provide relatively rigid properties, so as to stably support the pre-alignment inducing agent AIA' on the surfaces of the first display panel 100 and the second display panel 200. Further, the linking group (*-A-*) of the pre-alignment inducing agent AIA' has a straight chain or branched chain structure of 20 carbon atoms or less, 4 to 20 carbon atoms, or 6 carbon atoms, in order to have relatively flexible properties and to exhibit hydrophobicity. The pre-alignment inducing agent AIA' thus may be aligned in a direction toward the liquid crystal layer 310, so as to be maintained at a stabilized state. That is, the pre-alignment inducing agent AIA' may be vertically self-aligned due to the attractive force and repulsive force formed by the surfaces of the first and second display panels 100 and 200. In this case, each of the first pre-alignment inducing layer 430 and the second pre-alignment inducing layer 440 may be a monomolecular layer composed of only the self-aligned pre-alignment inducing agent AIA'.

Subsequently, referring to FIGS. 7 and 12, the liquid crystal layer 311 is heated (S130). The step (S130) of heating the liquid crystal layer 311 may be a step used to improve the spreadability and uniformity of liquid crystals in the liquid crystal layer 311. In an exemplary embodiment, the step of heating the liquid crystal layer 311 may include heating the liquid crystal layer 311 to a temperature which is about 0.1° C. to about 20° C. higher than the isotropic phase transition temperature of liquid crystals in the liquid crystal layer 311.

Subsequently, referring to FIGS. 7 and 13, the heated liquid crystal layer 312 is cooled (S140). The step (S140) of cooling the heated liquid crystal layer 312 may be used to improve the spreadability and uniformity of liquid crystals in the liquid crystal layer 312. In an exemplary embodiment, the step of cooling the heated liquid crystal layer 312 may include cooling the heated liquid crystal layer 312 to the isotropic phase transition temperature of the liquid crystals.

In another embodiment, the step (S140) of cooling the liquid crystal layer may be omitted. In this case, the primary light irradiation step (S150) to be described later may be performed in a state where the liquid crystal layer is heated to a temperature which is about 0.1° C. to about 20° C. higher than the isotropic phase transition temperature of the liquid crystals. In another embodiment, both the step (S130) of heating the liquid crystal layer and the step (S140) of cooling the liquid crystal layer may be omitted. In this case, the primary light irradiation step (S150) may be performed without an additional heat treatment process.

Subsequently, referring to FIGS. 7 and 14 to 16, light having a first wavelength is radiated (S150). In an exemplary embodiment, the primary light irradiation step (S150) of radiating light having a first wavelength, may include radiating light having a first wavelength to the surface of the panel, the light being incident substantially perpendicular to the surface of the panel and being polarized in the second direction Y, to initially horizontally align the liquid crystals LC and to stabilize the liquid crystals LC.

At least a part of the pre-alignment inducing agent having a structure represented by Chemical Formula 2-A above, the pre-alignment inducing agent being in a trans-isomer state, may absorb the light having a first wavelength, so as to be trans-cis-isomerized into an alignment inducing agent AIA having a structure represented by Chemical Formula 1-A below, the alignment inducing agent AIA being in a cis-isomer state.

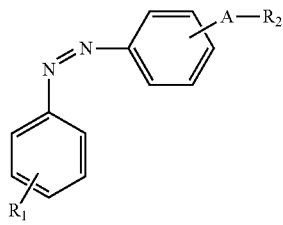

Chemical Formula 1-A

In Chemical Formula 1-A above, $R_1$, $R_2$, and A are the same as those defined in Chemical Formula 2-A.

That is, the first pre-alignment inducing layer (430 of FIG. 13) and the second pre-alignment inducing layer (440 of FIG. 13) respectively formed on the surface of the first display panel 100 and the surface of the second display panel 200, each of which includes the pre-alignment inducing agent having a structure represented by Chemical Formula 2-A above, absorb the light having a first wavelength, so as to be respectively converted into a first pre-alignment inducing layer 431 and a second pre-alignment inducing layer 441, each of which is made of the alignment inducing agent AIA having a structure represented by Chemical Formula 1-A above.

Specifically, the hydrophilic group ($R_1$—*) of the alignment inducing agent AIA having a structure represented by Chemical Formula 1-A above may have strong bonding force to the surfaces of the first display panel 100 and the second display panel 200 and may be maintained in an approximately vertically self-aligned state, whereas the linking group and end groups (*-A-$R_2$) of the alignment inducing agent AIA may be rearranged within the molecule to be positioned in a direction which is substantially parallel to the first direction X by the light polarized in the second direction Y. Due to the change in the arrangement direction of the linking group and the end group (*-A-$R_2$) having a sufficient chain length and an affinity with the liquid crystals LC, adjacent liquid crystals LC may be aligned in the same direction as the linking group and end group (*-A-$R_2$) of the alignment inducing agent AIA (that is, first direction) to be maintained in a stabilized state. Particularly, since the alignment inducing agent AIA only has a single azo group, a cis-structure is formed at only one site within the molecule and thus is able to align the linking group and the end group (*-A-$R_2$) in a direction approximately parallel to the surfaces of the adjacent first and second display panels 100 and 200, and thus the liquid crystals LC in the liquid crystal layer 312 may be horizontally aligned. Further, since the alignment inducing agent AIA has only two benzene rings, a stable cis-isomer state may be maintained while not hindering the alignment of an adjacent alignment inducing agent.

The first wavelength is not particularly limited as long as the isomerization of the pre-alignment inducing agent is initiated. For example, the first wavelength may be a wavelength having a peak wavelength within a range of about 350 nm to about 600 nm, about 350 nm to about 450 nm, or about 355 nm to about 375 nm. The first light irradiation step (S150) may be performed at an irradiance of about 10 microwatts per square centimeter ($\mu W/cm^2$) to about 1 watt per square centimeter ($W/cm^2$) for about 10 seconds to about 100 minutes. In first light irradiation step (S150), the photocurable monomers RM may be uniformly dispersed in the liquid crystal layer 312.

Subsequently, referring to FIGS. 7 and 17 to 19, light having a second wavelength is radiated at a second exposure (S160). In an exemplary embodiment, the secondary light irradiation step (S150) of radiating light having a second wavelength at a second exposure may be a step of forming a photocurable polymer RMP.

The photocurable monomers (not shown) absorb the light having a second wavelength and are polymerized into a photocurable polymer RMP, and as a result, the content of the photocurable monomers in the liquid crystal layer 300 may be reduced. The photocurable polymers RMP are adsorbed on the surfaces of the first display panel 100 and the second display panel 200 to be formed into an alignment stabilizing layer. For example, the photocurable monomer may be a reactive mesogen. The first and second alignment inducing layers 411 and 421 including the alignment stabilizing layer made of the photocurable polymer RMP, can form a rigid solid film to impart excellent alignment stability to heat and/or light.

Further, the second light irradiation step (S160) of radiating the light having a second wavelength may be a step of radiating light such that the content of photocurable monomers (not shown) in the liquid crystal layer 300 is about 100 ppm or less. When the content of unreacted photocurable monomers in the liquid crystal layer 300 is within the above range, defective afterimages can be prevented.

The second wavelength is not particularly limited as long as the polymerization reaction of the photocurable monomers is initiated. For example, the second wavelength may be a wavelength having a peak wavelength within a range of about 350 nm to about 380 nm or about 350 nm to about 360 nm. The second light irradiation step (S160) may be performed at an irradiance of about 100 $\mu W/cm^2$ to about 1 $W/cm^2$ or about 1 $mW/cm^2$ to about 200 $mW/cm^2$, for about 1 minute to about 120 minutes.

In an exemplary embodiment, the first light irradiation step (S150) may be a step of radiating the light having a first wavelength, and the second light irradiation step (S160) may be a step of radiating the light having a second wavelength shorter than the first wavelength. For example, the first wavelength may be a wavelength of about 400 nm to about 450 nm, and the second wavelength may be a wavelength of about 350 nm to about 380 nm. Since the isomerization reaction of the pre-alignment inducing agent AIA' is remarkably superior to the polymerization reaction of the photocurable monomers in a wavelength range of about 400 nm or more, the initiation of horizontal alignment and the formation of an alignment stabilizing layer may be performed stepwise.

In another embodiment, the first light irradiation step (S150) may be a step of radiating the light having a first wavelength at a first exposure during a first period, and the second light irradiation step (S160) may be a step of radiating the light having a second wavelength substantially the same as the first wavelength at a second exposure greater than the first exposure during a second period longer than the first period. For example, each of the first wavelength and the second wavelength may be a wavelength of about 350 nm to about 380 nm, the first exposure may be about 10 $\mu W/cm^2$ to about 10 $mW/cm^2$, and the second exposure may be about 1 $mW/cm^2$ to about 1 $W/cm^2$. Further, the first period may be about 10 seconds to about 10 minutes, and the second period may be about 1 minute to about 60 minutes. Since the isomerization reaction of the pre-alignment inducing agent MA' is remarkably sensitive to light compared to the polymerization reaction of the photocurable monomers, in the wavelength range in which both the isomerization reaction of the pre-alignment inducing agent AIA' and the polymerization reaction of the photocurable monomers proceed, the initiation of horizontal alignment and the formation of an alignment stabilizing layer may be performed in a stepwise manner.

The light having the second wavelength may be unpolarized light, but may be polarized light. In the present specification, the unpolarized light refers to light composed of random polarization components.

Figure 20:
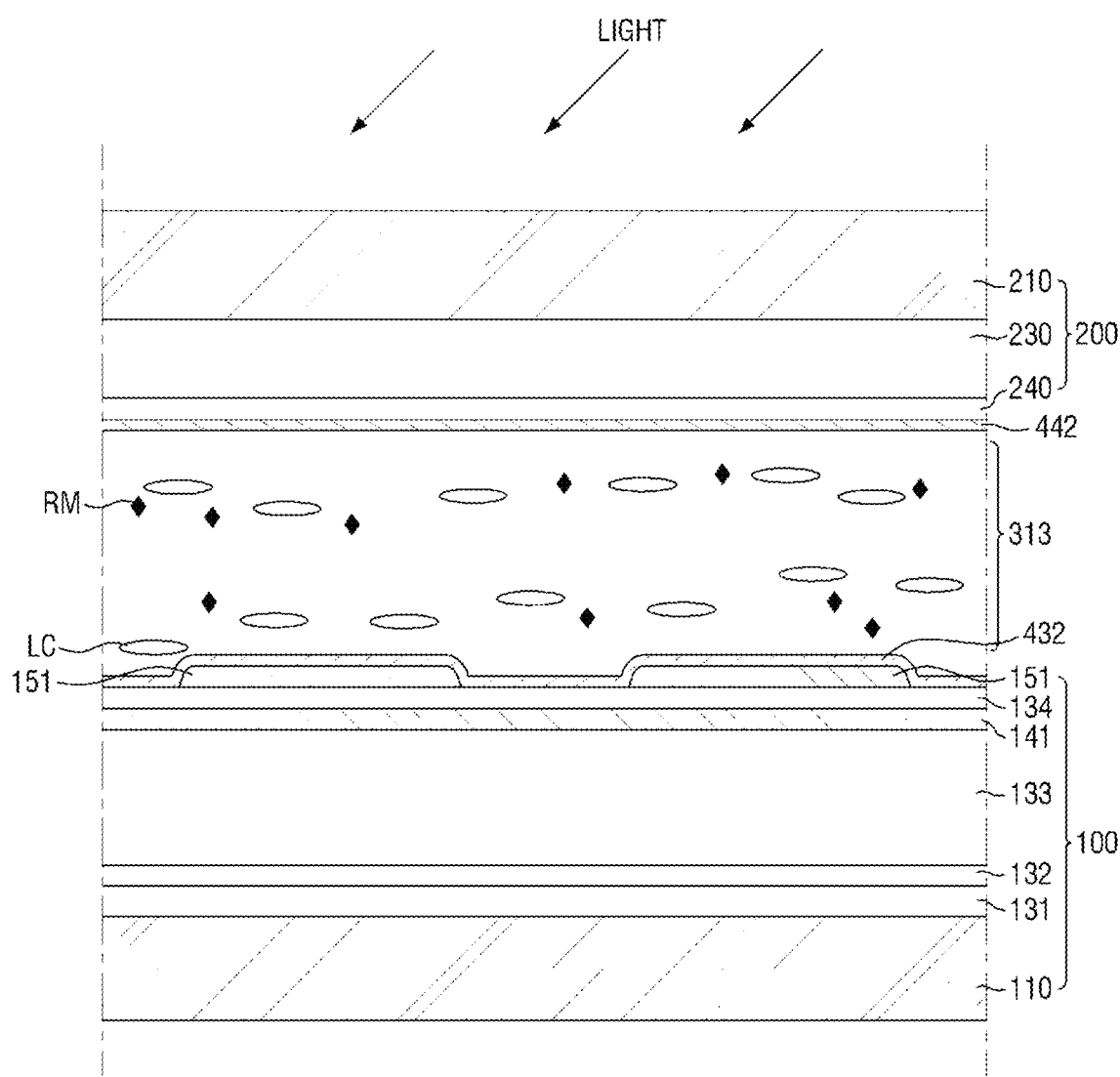
FIG. 20 is a cross-sectional view showing the step corresponding to FIG. 14 in the method of manufacturing a display device according to another embodiment.

FIG. 20 is a cross-sectional view showing the step corresponding to FIG. 14 in the method of manufacturing a display device, according to another embodiment of the present disclosure.

Referring to FIGS. 7 and 20, the first light irradiation step (S150) in the method of manufacturing a display device according to this embodiment is different from the first light irradiation step according to the embodiment of FIG. 14 in that the light having the first wavelength is radiated to initially horizontally align liquid crystals LC, the light being obliquely incident on the surface of the panel.

The light having the first wavelength may be radiated from one side of the liquid crystal layer 313 in the second direction Y. That is, in a plane view, the optical path of the light may be substantially parallel to the second direction Y. When the light is radiated from one side of the liquid crystal layer 313 in the second direction Y, the linking group and end group of the alignment inducing agent may be rearranged within the molecule to be positioned in a direction which is substantially parallel to the first direction X.

The angle of incidence of the light having the first wavelength relative to the surface of the panel is not particularly limited as long as the isomerization of a pre-alignment inducing agent is efficiently induced. For example, the angle of incident may be about 20° to about 60°, about 45°, or about 30°.

Hereinafter, the present disclosure will be described in more detail with reference to the Examples and the Comparative Example.

EXAMPLES

Comparative Example

A liquid crystal composition including 0.2 wt % of a compound having a structure represented by Chemical Formula 2-G below, 0.3 wt % of a reactive mesogen, 0.01 wt % of a photoinitiator, and a balance of a liquid crystal host MLC-156000-100 (manufactured by Merck Co., Ltd.) was provided.

Figure 21A:
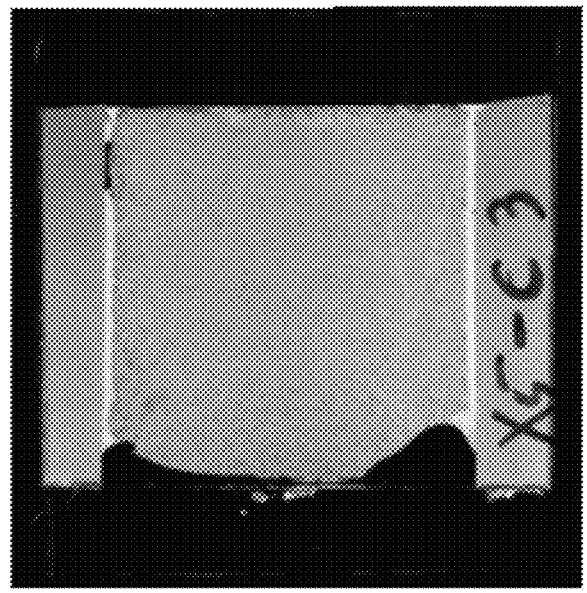
FIG. 21A and FIG. 21B shows images of a test cell prepared according to the Comparative Example.
Figure 21B:
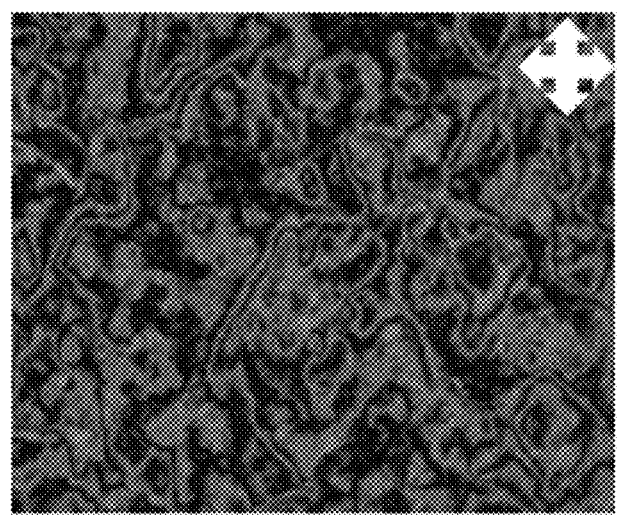

Then, a PLS test cell was prepared using the provided liquid crystal composition and an unaligned substrate, and then polarizers orthogonal to each other (horizontal direction and longitudinal direction of FIG. 21) were disposed over and under the test cell. FIGS. 21A and 21B show the entire image of the test cell and a microscope image of the test cell when a voltage was not applied to the test cell, respectively.

FIG. 21A shows the entire image (above) of the test cell and FIG. 21B shows a microscope image (below) of a part of the test cell. Referring to FIGS. 21A and 21B, it can be ascertained that the liquid crystals of the test cell prepared using the liquid crystal composition including the compound represented by Chemical Formula 2-G above and the liquid crystal host having a positive dielectric anisotropy, are irregularly horizontally arranged without being initially aligned.

Example 1

Figure 22A:
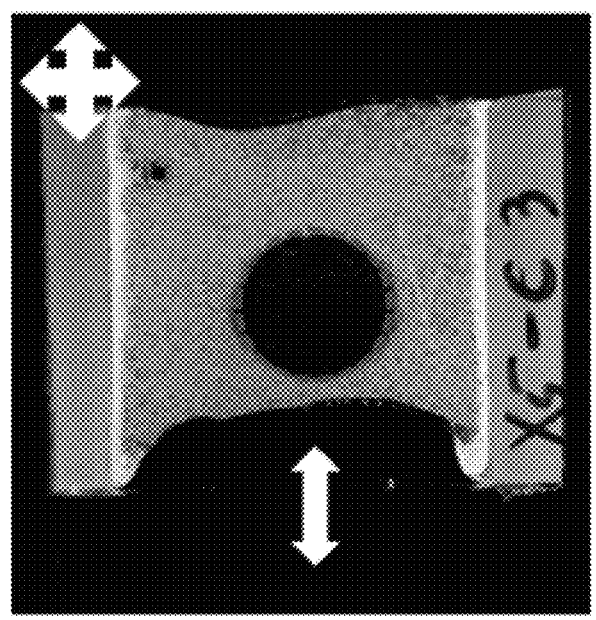
FIGS. 22A, 22B, 23A, 23B, 24A, 24B, 25A, and 25B show images of test cells prepared according to Examples 1 to 4.
Figure 22B:
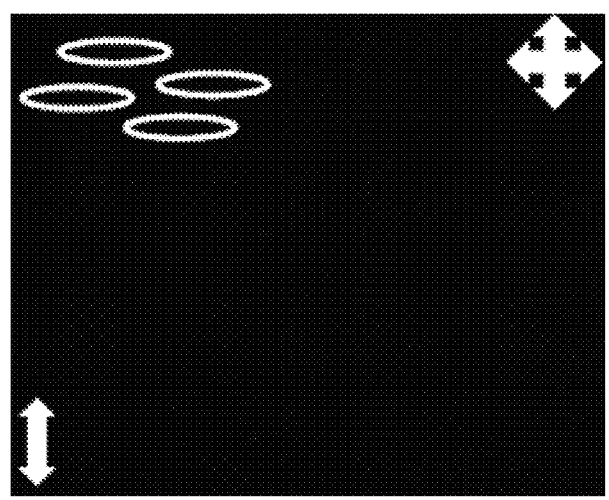

A portion (dotted area of FIG. 22A) of the test cell having the same structure as the Comparative Example, was irradiated with light having a wavelength of 380 nm to 410 nm and linearly polarized in one direction (longitudinal direction shown in FIG. 22A) at an intensity of 10 mW/cm² for 10 minutes under a condition of 110° C. to prepare a test cell, the prepared test cell was cooled to room temperature, and then polarizers orthogonal to each other (horizontal direction and longitudinal direction of the drawing) were disposed over and under the test cell. FIGS. 22A and 22B show the entire image of the test cell and a microscope image of the test cell when a voltage was not applied to the test cell.

FIG. 22A shows the entire image of the test cell according to Example 1 and FIG. 22B shows a microscope image of the dotted area of the test cell in FIG. 22A. Referring to FIGS. 22A and 22B, it can be ascertained that the area which was not irradiated with light directly maintains an initial random horizontal alignment state, whereas the area (i.e., corresponding to the dotted area) having been irradiated with polarized light, does not transmit light when a voltage was not applied. Without being limited by theory, it is believed the reason for this is that in the initial alignment state, the direction of the transmission axis of any polarizer is approximately orthogonal to the direction of the major axis of liquid crystals.

Example 2

Figure 23A:
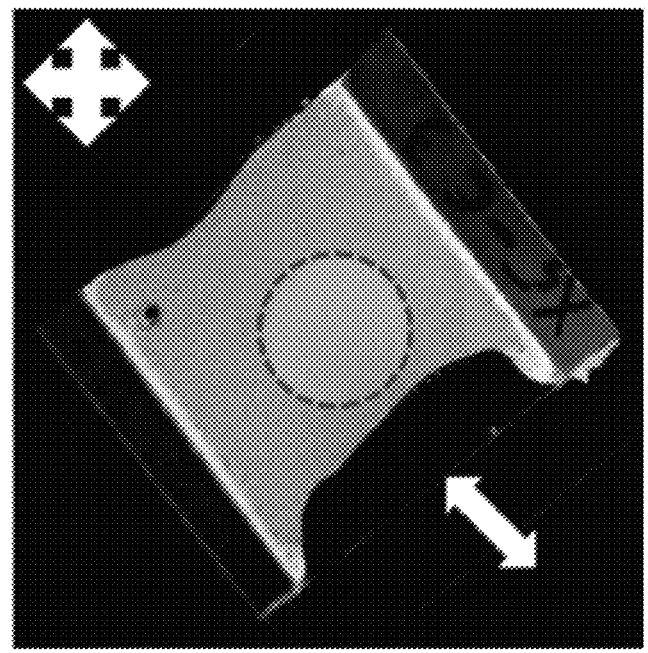
Figure 23B:
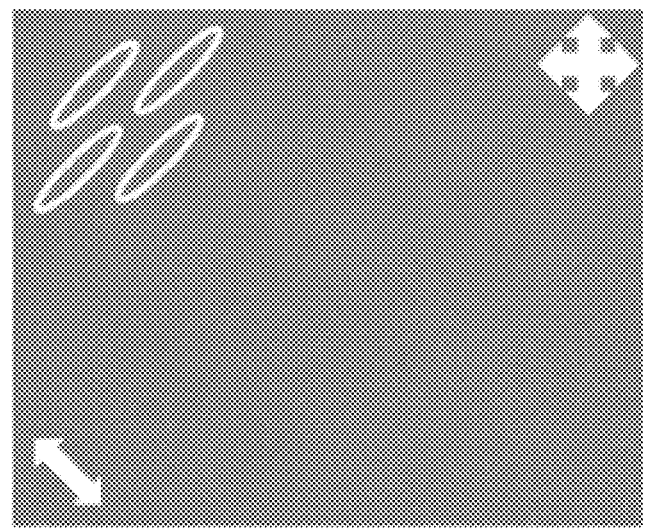

The test cell prepared according to Example 1 was rotated by 45° in a counterclockwise direction, and then polarizers orthogonal to each other (horizontal direction and longitudinal direction of FIG. 23A) were disposed over and under the test cell. FIGS. 23A and 23B show the entire image of the test cell and a microscope image of the test cell when a voltage was not applied to the test cell.

FIG. 23A shows the entire image of the test cell according to Example 2 and FIG. 23B shows a microscope image of the dotted area of the test cell. Referring to FIG. 23A, it can be ascertained that the area (dotted area) having been Chemical Formula 2-G

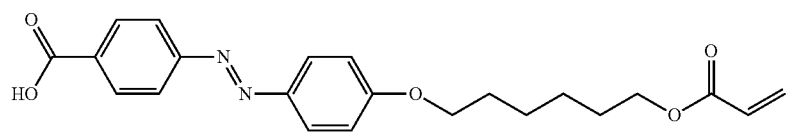

irradiated with polarized light, partially transmits light when a voltage was not applied. Without being limited by theory, it is believed that the reason for this is that in the initial alignment state, the angle between the direction of the transmission axis of any polarizer and the direction of the major axis of liquid crystals is approximately 45°.

Example 3

Figure 24A:
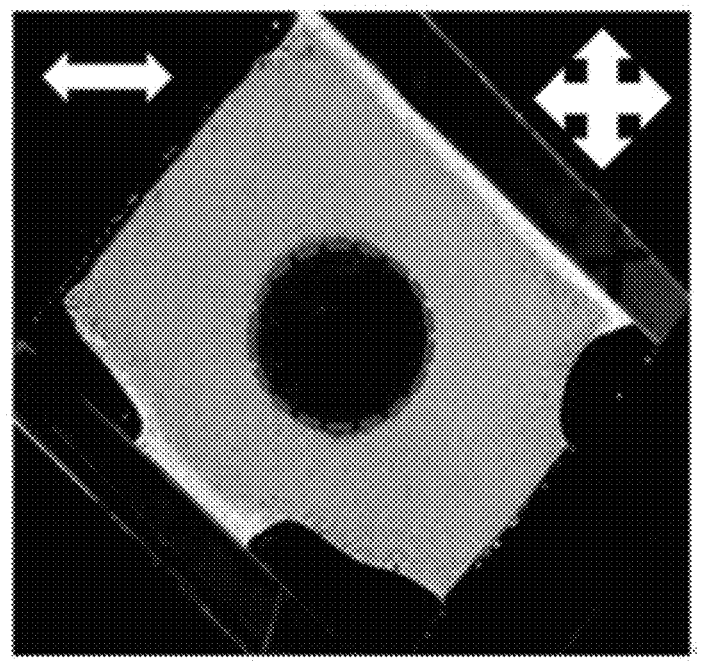
Figure 24B:
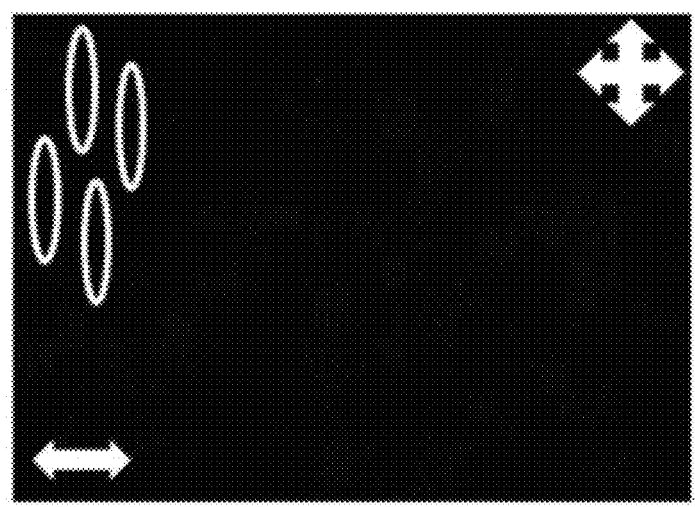

A part (dotted area of FIG. 24A) of the test cell having the same structure as Comparative Example was irradiated with light having a wavelength of 380 nm to 410 nm linearly polarized in one direction (horizontal direction in FIG. 24A) at an intensity of 10 mW/cm$^2$ for 10 minutes under a condition of 110° C. to prepare a test cell. The prepared test cell was cooled to room temperature and was then irradiated with light having a wavelength of 350 nm to 380 nm at an intensity of 100 mW/cm$^2$ for 60 minutes. Then, the test cell was left at 110° C. for 15 hours. Then, polarizers orthogonal to each other (horizontal direction and longitudinal direction of FIG. 24A) were disposed over and under the test cell. FIGS. 24A and 24B show the entire image of the test cell and an microscope image of the test cell when a voltage was not applied to the test cell.

FIG. 24A shows the entire image of the test cell according to Example 3 and FIG. 24B shows a microscope image of the dotted area of the test cell. Referring to FIGS. 24A and 24B, it can be ascertained that the area (dotted area) having been irradiated with polarized light does not transmit light when a voltage was not applied. That is, it can be ascertained that, in the test cell according to Example 3, the direction of initial alignment of liquid crystals is not disturbed even under a high temperature condition, and thus excellent alignment stability can be obtained.

Example 4

Figure 25A:
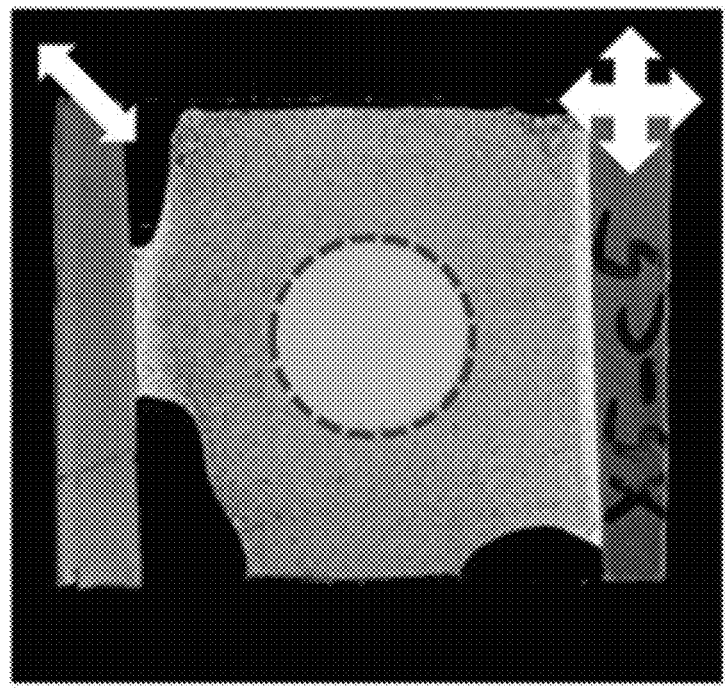
Figure 25B:
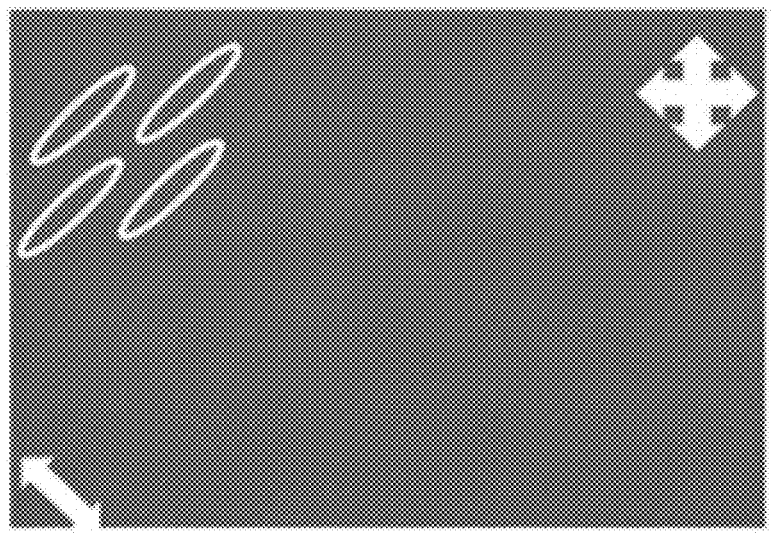

The test cell prepared according to Example 3 was rotated by 45° in a clockwise direction, and then polarizers orthogonal to each other (horizontal direction and longitudinal direction of FIG. 25A) were disposed over and under the test cell. FIGS. 25A and 25B show the entire image of the test cell and a microscope image of the test cell when a voltage was not applied to the test cell.

FIG. 25A shows the entire image of the test cell according to Example 4 and FIG. 25B shows a microscope image of the dotted area of the test cell. Referring to FIGS. 25A and 25B, it can be ascertained that the area (dotted area) having been irradiated with polarized light partially transmits light when a voltage was not applied. That is, it can be ascertained that, in the test cell according to Example 4, the direction of initial alignment of liquid crystals is not disturbed even under a high temperature condition, and thus excellent alignment stability can be obtained.

As described above, according to embodiments of the present disclosure, there are the following effects.

According to the liquid crystal composition of an embodiment of the present disclosure, in spite of not using an additional polymer alignment film, liquid crystals are horizontally aligned to be maintained at a stabilized state. Further, a display device having excellent display quality and improved reliability can be provided by minimizing defective afterimages which occur when driving the display device and by improving a reaction rate.

Moreover, the cost taken to maintain and manage an alignment film composition for manufacturing an alignment film can be reduced, and a process of manufacturing an alignment film can be simplified by omitting the processes of drying, curing, and baking the alignment film.

The effects of the present disclosure are not limited by the foregoing, and other various effects are anticipated herein.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A liquid crystal composition, comprising:
a plurality of liquid crystals;
a photocurable monomer; and
a compound having a structure represented by Chemical Formula 2-A:

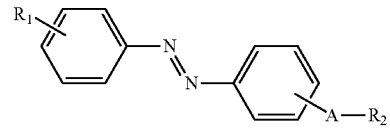

Chemical Formula 2-A where in Chemical Formula 2-A, R$_1$ is

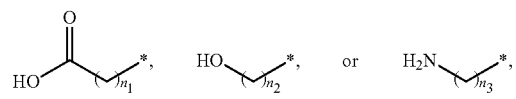

$n_1$ is an integer of 0 to 2, and $n_2$ and $n_3$ are each independently an integer of 1 to 3, which is different from a terminal group of R$_2$, R$_2$ is a hydrogen atom,

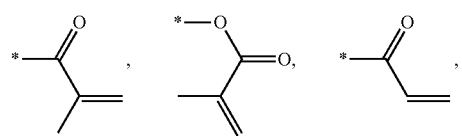

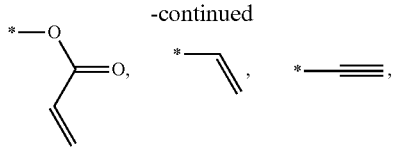

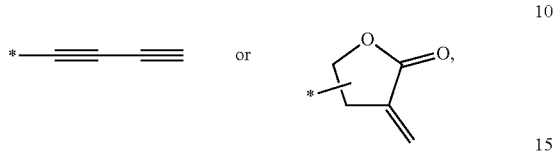

and A is an alkylene group of 1 to 20 carbon atoms, an alkyleneoxy group of 1 to 20 carbon atoms, or a single bond, wherein * indicates point of attachment.

2. The liquid crystal composition of claim 1, wherein the compound having the structure represented by Chemical Formula 2-A is a compound having a structure represented by Chemical Formula 2-B:

Chemical Formula 2-B

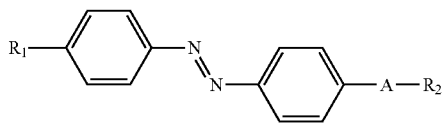

where in Chemical Formula 2-B, $R_1$ is

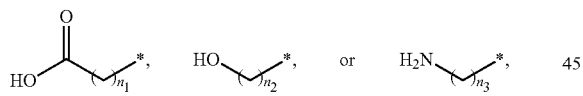

$n_1$ is an integer of 0 to 2, and $n_2$ and $n_3$ are each independently an integer of 1 to 3, and $R_2$ and A are the same as those defined in Chemical Formula 2-A.

3. The liquid crystal composition of claim 1, wherein the compound having the structure represented by Chemical Formula 2-A is a compound having a structure represented by Chemical Formula 2-G below:

Chemical Formula 2-G

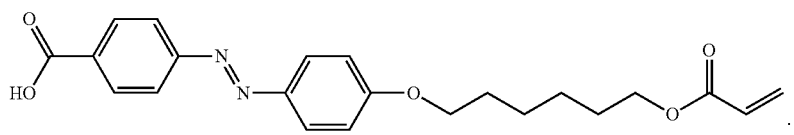

4. The liquid crystal composition of claim 1,
wherein the photocurable monomer comprises a mesogen comprising a core structure and at least one end group selected from

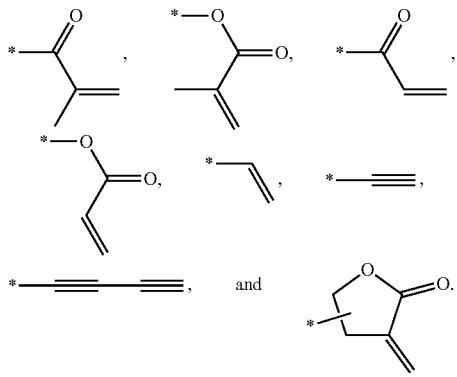

5. The liquid crystal composition of claim 1,
wherein the liquid crystal composition has positive dielectric anisotropy, and the compound having the structure represented by Chemical Formula 2-A has a molecular weight of about 200 to about 650 grams per mole.

6. The liquid crystal composition of claim 5,
wherein, based on the total weight of the liquid crystal composition, the content of the photocurable monomer is about 0.01 weight percent to about 2.0 weight percent, and the content of the compound having the structure represented by Chemical Formula 2-A is about 0.01 weight percent to about 1.0 weight percent.

7. The liquid crystal composition of claim 6,
wherein a solubility of the compound having the structure represented by Chemical Formula 2-A in the plurality of liquid crystals at 25° C. is about 0.01 weight percent to about 0.2 weight percent.

* * * * *